United States Patent
Kubo

(10) Patent No.: US 12,211,427 B2
(45) Date of Patent: Jan. 28, 2025

(54) IMAGE PROCESSING DEVICE AND METHOD, AND IMAGE DISPLAY APPARATUS, AND PROGRAM AND RECORDING MEDIUM

(71) Applicant: Mitsubishi Electric Corporation, Tokyo (JP)

(72) Inventor: Toshiaki Kubo, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 137 days.

(21) Appl. No.: 18/008,180

(22) PCT Filed: Jul. 16, 2020

(86) PCT No.: PCT/JP2020/027676
§ 371 (c)(1),
(2) Date: Dec. 5, 2022

(87) PCT Pub. No.: WO2022/014009
PCT Pub. Date: Jan. 20, 2022

(65) Prior Publication Data
US 2023/0282155 A1    Sep. 7, 2023

(51) Int. Cl.
G09G 5/02      (2006.01)
G06T 5/40     (2006.01)
G09G 3/32      (2016.01)

(52) U.S. Cl.
CPC ............ G09G 3/32 (2013.01); G06T 5/40 (2013.01); *G06T 2207/10024* (2013.01);
(Continued)

(58) Field of Classification Search
CPC ............ G06T 5/40; G06T 2207/10024; G06T 2207/20081; G06T 2207/20084; G09G 2360/16
(Continued)

(56) References Cited

U.S. PATENT DOCUMENTS

| | | | |
|---|---|---|---|
| 2003/0146919 A1* | 8/2003 | Kawashima | H04N 5/74 348/E5.119 |
| 2004/0105596 A1* | 6/2004 | Inoue | G09G 5/00 382/167 |

(Continued)

FOREIGN PATENT DOCUMENTS

| | | |
|---|---|---|
| CN | 101272504 A | 9/2008 |
| JP | 2008-158399 A | 7/2008 |

(Continued)

OTHER PUBLICATIONS

International Search Report and Written Opinion mailed on Sep. 1, 2020, received for PCT Application PCT/JP2020/027676, filed on Jul. 16, 2020, 8 pages including English Translation.

(Continued)

*Primary Examiner* — Gordon G Liu
(74) *Attorney, Agent, or Firm* — XSENSUS LLP

(57) ABSTRACT

A conversion table is generated from an average luminance value, a histogram, and a peak luminance value of an input image, and is used for conversion of the input image to generate an output image, for display at an image display. The conversion table has a feature by which, when the input gradation value is equal to the peak luminance value, the gradation value of the output image is made to be also equal to the peak luminance value, and, in at least part of a range in which the input gradation value is lower than the peak luminance value, the output gradation value is made to be smaller than the gradation value of the input image.

17 Claims, 14 Drawing Sheets

(52) U.S. Cl.
CPC .............. *G06T 2207/20081* (2013.01); *G06T 2207/20084* (2013.01); *G09G 2330/021* (2013.01); *G09G 2360/16* (2013.01)

(58) Field of Classification Search
USPC ........................................................ 345/589
See application file for complete search history.

(56) References Cited

U.S. PATENT DOCUMENTS

| | | | |
|---|---|---|---|
| 2006/0267923 A1* | 11/2006 | Kerofsky | G09G 3/3406 345/102 |
| 2010/0085285 A1 | 4/2010 | Ozawa et al. | |
| 2010/0265228 A1 | 10/2010 | Kimura et al. | |
| 2015/0228224 A1* | 8/2015 | Park | G09G 3/3233 345/691 |

FOREIGN PATENT DOCUMENTS

| | | |
|---|---|---|
| JP | 2010-091719 A | 4/2010 |
| JP | 2010-250171 A | 11/2010 |
| JP | 2016-163099 A | 9/2016 |
| KR | 10-2012-0055895 A | 6/2012 |

OTHER PUBLICATIONS

Office Action issued Jul. 25, 2023 in counterpart Japanese Patent Application No. 2022-536068 with machine English translation thereof, 9 pages.

* cited by examiner

IMAGE PROCESSING DEVICE AND METHOD, AND IMAGE DISPLAY APPARATUS, AND PROGRAM AND RECORDING MEDIUM

CROSS-REFERENCE TO RELATED APPLICATION

The present application is based on PCT filing PCT/JP2020/027676, filed Jul. 16, 2020, the entire contents of which are incorporated herein by reference.

TECHNICAL FIELD

The present disclosure relates to an image processing device and method, and an image display device, and particularly to a technique for reducing power consumption of an image display apparatus of a self-light-emission type, such as an LED display. The present disclosure also relates to a program and a recording medium.

BACKGROUND ART

A self-light-emission type display such as an LED display or an organic EL display consumes more power as the average display luminance within a screen is increased. If the displayed image is darkened uniformly, the power consumption can be reduced, but the visibility is also degraded. A technological challenge is to achieve both of the maintenance of the image quality and the reduction of the power consumption.

Patent reference 1 proposes a method in which an area within a screen at which the viewer's attention is concentrated is designated as a reference area, and the display luminance of the original image is gradually decreased with the distance from the reference area, so as to minimize the luminance reduction in the reference area, and also to reduce the power consumption.

PRIOR ART REFERENCES

Patent References

Patent Reference 1: Japanese Patent Application Publication No. 2008-158399

SUMMARY OF THE INVENTION

Problems to be Solved by the Invention

With the technique disclosed in patent reference 1, a sufficient effect may not be obtained where the area to which the viewer's attention is directed differs from person to person, e.g., as in a case of a public display monitor. Also, in the case of images such as those produced by computer graphics, in which the variation in the tone is small, non-uniformity becomes conspicuous.

An object of the present disclosure is to provide a technique by which the visibility of the displayed image can be maintained, and, also, the power consumption can be reduced.

Means for Solving the Problem

An image display apparatus according to the present disclosure is an image processing device generating an output image based on an input image, and supplying the output image to an image display unit of a self-light-emission type to cause image display, said image processing device having:

an average luminance value calculator to calculate an average luminance value of said input image;

a histogram generator to generate a histogram of said input image;

a peak luminance value calculator to calculate a peak luminance value of said input image;

a conversion table generator to generate a conversion table defining a relation between a gradation value of said input image and a gradation value of said output image based on said average luminance value, said histogram and said peak luminance value; and an image converter to generate said output image by converting said input image using said conversion table;

wherein said conversion table generator generates, as said conversion table, a conversion table by which, when the gradation value of said input image is equal to said peak luminance value, the gradation value of said output image is made to be also equal to said peak luminance value, and, in at least part of a range in which the gradation value of said input image is higher than 0 and lower than said peak luminance value, the gradation value of said output image is made to be smaller than the gradation value of said input image.

Effect of the Invention

According to the present disclosure, it is possible to maintain the visibility of the displayed image and to reduce the power consumption.

MODE FOR CARRYING OUT THE INVENTION

First Embodiment

Figure 1:
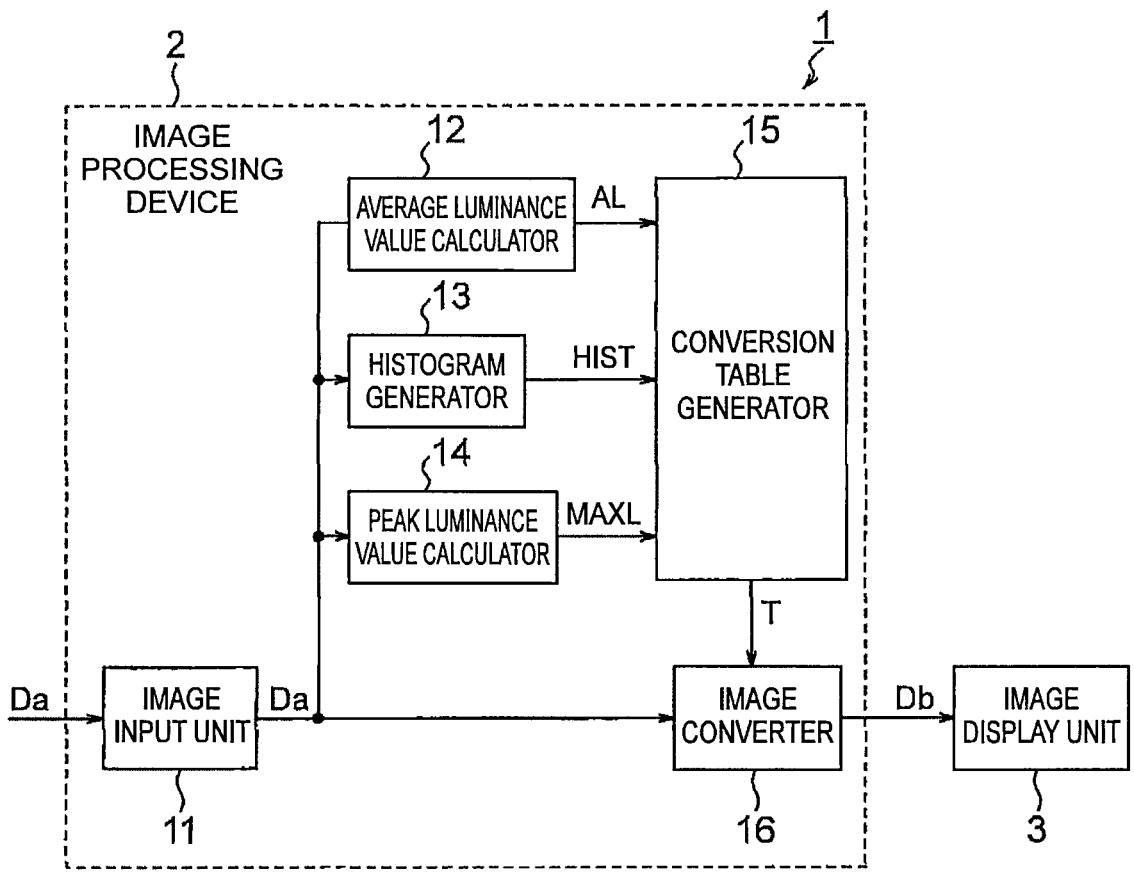
FIG. 1 is a functional block diagram showing a configuration of an image processing device according to a first embodiment.

FIG. 1 is a diagram showing a configuration of an image display apparatus according to a first embodiment.

The image display apparatus 1 shown in FIG. 1 has an image processing device 2 and an image display unit 3.

The image display unit 3 is a display of a self-light-emission type, such as an LED (light-emitting diode) display, or an organic EL (electroluminescence) display. In the following description, it is assumed that the image display unit 3 is an LED display.

The image display unit 3 is formed of a display having a display panel in which red, green and blue LEDs are arrayed. For example, each light emitting element is formed of a combination of a red, green and blue LEDs, and a plurality of such light-emitting elements are regularly arrayed as pixels in a matrix fashion to form a display panel.

The image processing device 2 corrects an image (input image) Da supplied from outside, to generate an output image (corrected image) Db, and causes the output image Db to be displayed on the image display unit 3.

The image processing device 2 has an image input unit 11, an average luminance value calculator 12, a histogram generator 13, a peak luminance value calculator 14, a conversion table generator 15, and an image converter 16.

The image input unit 11 receives and outputs the input image Da.

In the following description, it is assumed that the image input unit 11 is a digital interface which receives and outputs digital image data representing the input image Da. However, the image input unit 11 may be formed of an analog-to-digital converter which converts an analog image signal into digital image data.

In the following description, it is assumed that the digital image data outputted from the image input unit 11 includes an R (red) component value, a G (green) component value, and a B (blue) component value for each pixel, and each component value is expressed by an eight-bit value.

The average luminance value calculator 12 calculates an average luminance value AL of the input image Da of each frame.

The luminance value of each pixel can be determined by weighted addition of the R component value, G component value and B component value of the particular pixel. The average luminance value AL of the input image Da of each frame can be obtained by determining an average of the luminance values over all the pixels belonging to the particular frame.

The histogram generator 13 generates a histogram HIST from the input image Da of each frame.

For example, the histogram generator 13 calculates a maximum component value M which is the largest value among the R component value, G component value and B component value for each pixel of the input image Da of each frame, and generates a histogram HIST representing a frequency of occurrence F(C) of the maximum component values M for each class (bin). Each class C is formed of a predetermined number of the maximum component values M consecutive to each other. In the following description, it is assumed that the number of the maximum component values belonging to each class is 8.

However, the number of the maximum component values M belonging to each class may be other than 8. It may for example be 16 or 1.

If each component value is an eight-bit value, and the number of maximum component values M belonging to each class is 8, the number of classes is 32.

Figure 2:
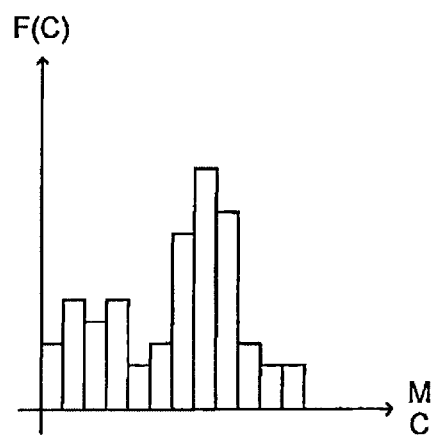
FIG. 2 is a diagram showing an example of a histogram generated by a histogram generator in FIG. 1.

FIG. 2 shows an example of the histogram HIST having been generated. In FIG. 2, the horizontal axis represents the maximum component value N and the class C.

The maximum component value M can assume a value of 0 to 255, and the class C can assume a value of 0 to 32.

The vertical axis in FIG. 2 represents a frequency of occurrence F(C) of the maximum component values M belonging to each class C, i.e., the number of pixels of which the maximum component value M belongs to the particular class C. The range of the values which can be assumed by the frequency of occurrence F(C) is from 0 to the total number of pixels in the frame.

The frequency of occurrence of each class is expressed by a bar having the same width as the range of the maximum component values belonging to the particular class.

The histogram generator 13 may be one which generates a histogram representing the frequency of occurrence of the luminance values, instead of the maximum component values M, of the pixels for each class. In this case, each class is formed of a predetermined number of luminance values consecutive to each other.

The peak luminance value calculator 14 calculates a peak luminance value MAXL of the input image Da of each frame. The peak luminance value MAXL of the input image Da of each frame is the largest luminance value among the luminance values of all the pixels belonging to the particular frame.

The conversion table generator 15 generates a conversion table T from the average luminance value AL calculated by the average luminance value calculator 12, the histogram HIST generated by the histogram generator 13, and the peak luminance value MAXL calculated by the peak luminance value calculator 14. The conversion table T is a table defining a relation between a gradation value (input gradation value) X of the input image Da and a gradation value (output gradation value) Y of the output image Db. Here, it is assumed that the gradation values X and Y are eight-bit values, and take a value of 0 to 255.

Figure 3:
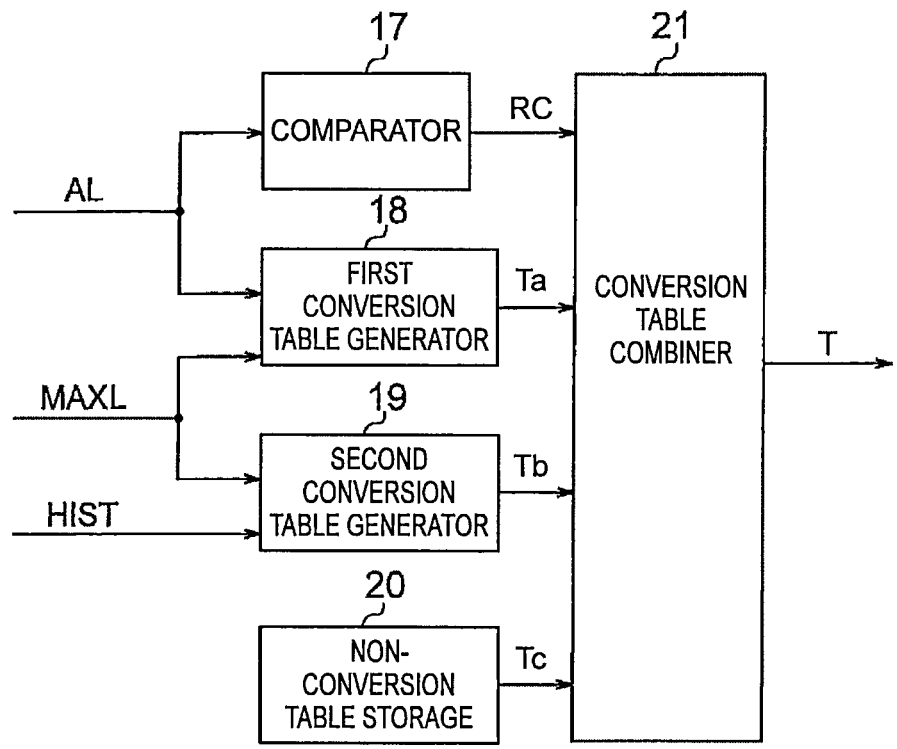
FIG. 3 is a functional block diagram showing an example of a configuration of a conversion table generator in FIG. 1.

FIG. 3 is a diagram showing an example of a configuration of the conversion table generator 15.

The illustrated conversion table generator 15 has a comparator 17, a first conversion table generator 18, a second conversion table generator 19, a non-conversion table storage 20, and a conversion table combiner 21.

The comparator 17 compares the average luminance value AL with a predetermined threshold value ALth, and outputs a comparison result RC.

The first conversion table generator 18 generates a first conversion table Ta which defines a relation between the input gradation value X and a first output gradation value Ya.

The second conversion table generator 19 generates a second conversion table Tb which defines a relation between the input gradation value X and a second output gradation value Yb.

The non-conversion table storage 20 stores a third conversion table Tc which defines a relation between the input gradation value X and a third output gradation value Yc.

It is assumed that the first, second and third output gradation values Ya, Yb, and Yc are also eight-bit values, and take values of 0 to 255.

The conversion table combiner 21 generates the conversion table T based on the comparison result RC, and the first, second, and third conversion tables Ta, Tb, and Tc. As was mentioned above, the conversion table T is a table defining the relation between the input gradation value X and the output gradation value Y. For the purpose of distinction from the first, second, and third conversion tables, the conversion table T may be called a combined conversion table. Also, for the purpose of distinction from the first, second and third output gradation values Ya, Yb, and Yc, the gradation value Y may be called a combined output gradation value.

The first conversion table generator 18 generates the first conversion table Ta based on the average luminance value AL calculated by the average luminance value calculator 12, and the peak luminance value MAXL calculated by the peak luminance value calculator 14.

Figure 4:
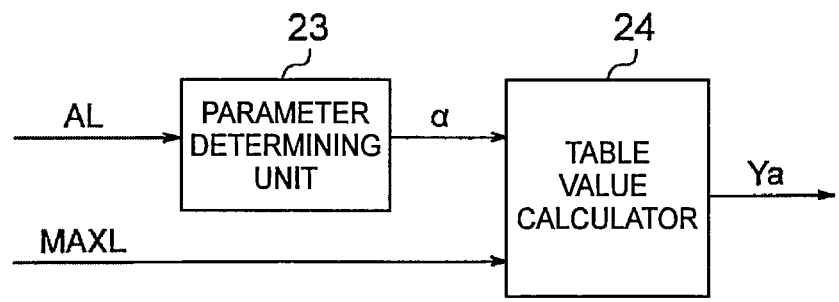
FIG. 4 is a functional block diagram showing an example of a configuration of a first conversion table generator in FIG. 1.

For example, the first conversion table generator 18 has a parameter determining unit 23, and a table value calculator 24, as shown in FIG. 4.

The parameter determining unit 23 determines the value of a parameter $\alpha$ based on the average luminance value AL. The parameter $\alpha$ takes a value not smaller than 1, and is made to have a larger value as the average luminance value AL is larger.

The table value calculator 24 calculates table values of the first conversion table Ta based on the parameter $\alpha$ and the peak luminance value MAXL. Here, the table value means the first output gradation value Ya associated with each of the input gradation values X. By calculating the first output gradation values Ya for all the input gradation values X, the first conversion table Ta is generated.

For example, the first conversion table generator 18 shown in FIG. 4 generates the first conversion table Ta in a first method or a second method described below.

In the first method, the parameter determining unit 23 determines the parameter $\alpha$ in the following way, for example. That is, when AL=100, then $\alpha$=1.2, and when AL=150, then $\alpha$=2. Also, when AL=0, then $\alpha$=1.

The table value calculator 24 determines the table values using the following formula (1).

[Mathematical Expression 1]

$$Ya = MAXL \times (X/MAXL)^{\alpha} \text{ (when } X < MAXL\text{)}$$
$$Ya = X \text{ (when } X \geq MAXL\text{)} \quad \text{Formula (1)}$$

Figure 5:
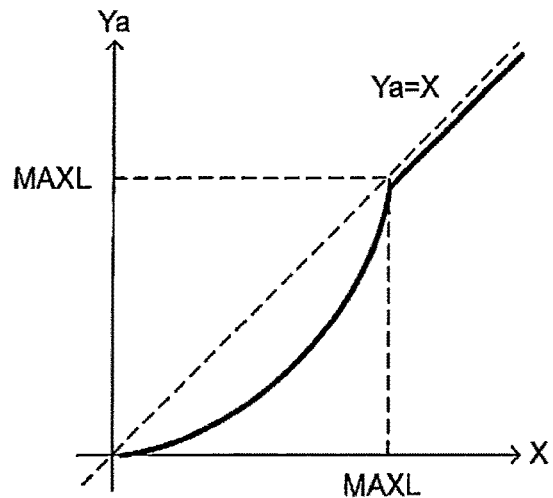
FIG. 5 is a graph showing an example of a first conversion table generated in a first method.

FIG. 5 is a graph showing an example of the first conversion table Ta generated in the first method. The horizontal axis represents the input gradation value X, and the vertical axis represents the first output gradation value Ya.

The first conversion table Ta shown in FIG. 5 is for performing the conversion in such a manner that the gradation value is lowered in the range higher than 0 and lower than the peak luminance value MAXL, while the peak luminance value is maintained. The expression "the peak luminance value is maintained" means that when the input gradation value X is equal to the peak luminance value MAXL, the first output gradation value Ya is also equal to the peak luminance value MAXL. The expression "the gradation value is lowered" means that the first output gradation value Ya is made lower than the input gradation value X.

Figure 6A:
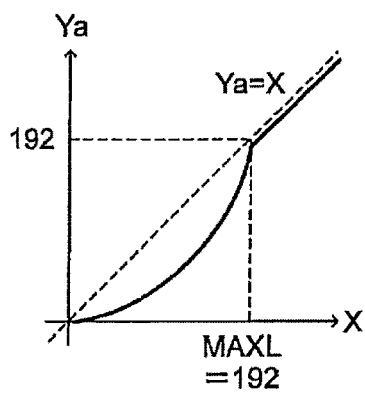
FIGS. 6($a$) and 6($b$) are diagrams for explaining a relation between a peak luminance value and the first conversion table generated in the first method.
Figure 6B:
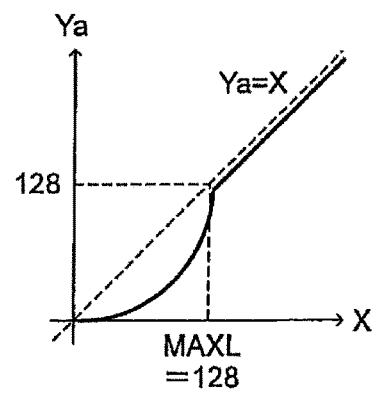

FIGS. 6(a) and 6(b) are diagrams for explaining a relation between the peak luminance value MAXL and the first conversion table Ta generated in the first method. The horizontal axis represents the input gradation value X, and the vertical axis represents the first output gradation value Ya.

FIG. 6(a) shows the first conversion table when the peak luminance value MAXL is 192, while FIG. 6(b) shows the first conversion table when the peak luminance value MAXL is 128. In either of these cases, when the input gradation value X is equal to the peak luminance value MAXL, the first output gradation value Ya is equal to the peak luminance value MAXL.

Figure 7A:
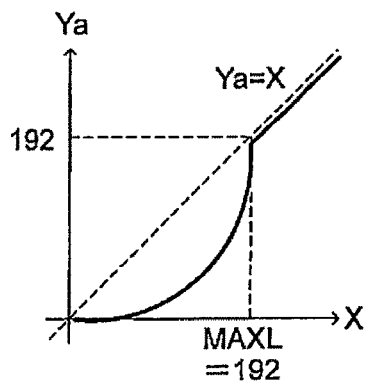
FIGS. 7($a$) and 7($b$) are diagrams for explaining a relation between an average luminance value and the first conversion table generated in the first method.
Figure 7B:
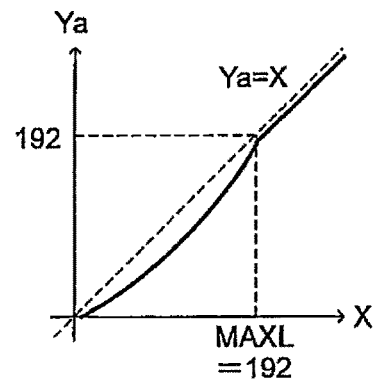

FIGS. 7(a) and 7(b) are diagrams for explaining a relation between the average luminance value AL and the first conversion table Ta generated in the first method. The horizontal axis represents the input gradation value X, and the vertical axis represents the first output gradation value Ya. In either of the cases of FIGS. 7(a) and 7(b), the peak luminance value MAXL is 192.

FIG. 7(a) shows the first conversion table when the average luminance value AL is 150, while FIG. 7(b) shows the first conversion table when the average luminance value AL is 100.

In the example shown in FIG. 7(a), the average luminance value AL is 150, and $\alpha$ is set to be 2. In the example shown in FIG. 7(b), the average luminance value AL is 100, and $\alpha$ is set to be 1.2.

In this way, $\alpha$ is varied depending on the average luminance value AL, and the width by which the first output gradation value Ya is made lower than the input gradation value X, in the range lower than the peak Luminance value MAXL is changed. Specifically, as the average luminance value AL is higher, $\alpha$ is made to assume a larger value, and the degree by which the curve is convex downward is made larger. Accordingly, the gradation conversion characteristic is such that the width by which the gradation value is lowered in the range lower than the peak luminance value MAXL is larger as the average luminance value AL is higher.

In the first method, the first conversion table Ta expressed by the formula (1) is generated as described above. In the second method, in place of the formula (1), the following formula (2) is used. Also, the parameter $\alpha$ of a different value is used.

That is, in the second method, the parameter determining unit 23 determines the parameter $\alpha$ in the following manner, for example. That is, when AL=100, then $\alpha$=1.5, and when AL=150, then $\alpha$=4. Also, when AL=0, then $\alpha$=1.

The table value calculator 24 calculates the table values using the following formula (2).

[Mathematical Expression 2]

$Ya=X/\alpha$ (when $X<\text{MAX}L/2$)

$Ya=((2\alpha-1)\times X-(\alpha-1)\times \text{MAX}L)/\alpha$ (when $\text{MAX}L/2 \leq X < \text{MAX}L$)

$Ya=X$ (when $X \geq \text{MAX}L$)   Formula (2)

Figure 8:
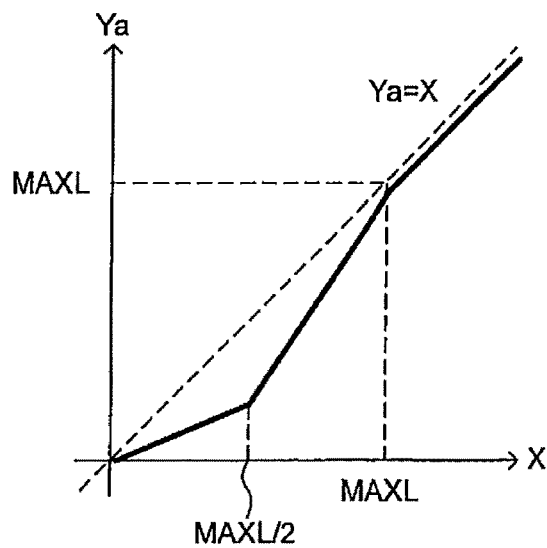
FIG. 8 is a graph showing an example of the first conversion table generated in a second method.

FIG. 8 is a graph showing an example of the first conversion table Ta generated in the second method. The horizontal axis represents the input gradation value X, and the vertical axis represents the first output gradation value Ya.

The first conversion table Ta shown in FIG. 8 is also for performing the conversion in such a manner that the gradation value is lowered in the range higher than 0 and lower than the peak luminance value MAXL, while maintaining the peak luminance value.

Figure 9A:
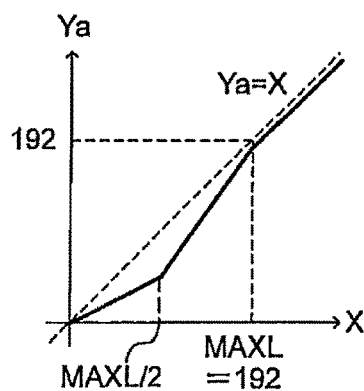
FIGS. 9($a$) and 9($b$) are diagrams for explaining a relation between the peak luminance value and the first conversion table generated in the second method.
Figure 9B:
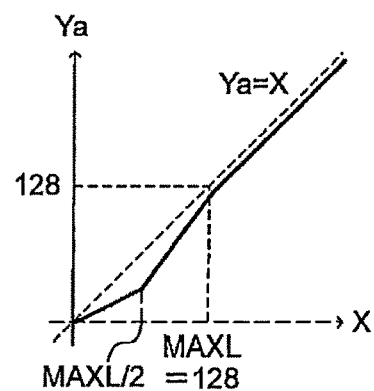

FIGS. 9(*a*) and 9(*b*) are diagrams for explaining a relation between the peak luminance value MAXL and the gradation conversion characteristic of the first conversion table Ta generated in the second method. The horizontal axis represents the input gradation value X, and the vertical axis represents the first output gradation value Ya.

FIG. 9(*a*) shows the first conversion table when the peak luminance value MAXL is 192, while FIG. 9(*b*) shows the first conversion table when the peak luminance value MAXL is 128. In either of these cases, when the input gradation value X is equal to the peak luminance value MAXL, the first output gradation value Ya is equal to the peak luminance value MAXL.

Figure 10A:
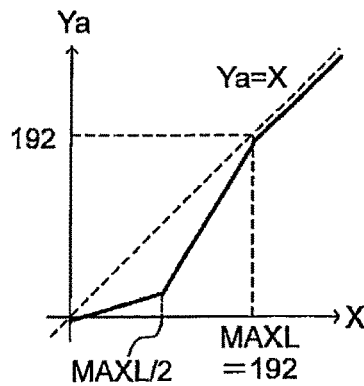
FIGS. 10($a$) and 10($b$) are diagrams for explaining a relation between the average luminance value and the first conversion table generated in the second method.
Figure 10B:
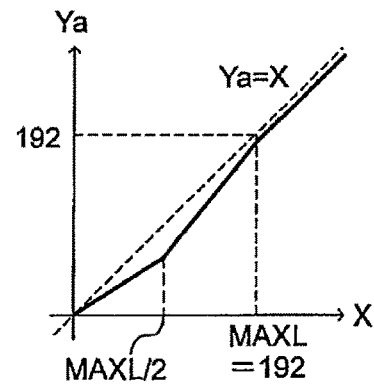

FIGS. 10(*a*) and 10(*b*) are diagrams for explaining a relation between the average luminance value AL and the first conversion table Ta generated in the second method. The horizontal axis represents the input gradation value X, and the vertical axis represents the first output gradation value Ya. In either of the cases of FIGS. 10(*a*) and 10(*b*), the peak luminance value MAXL is 192.

FIG. 10(*a*) shows the first conversion table when the average luminance value AL is 150, while FIG. 10(*b*) shows the first conversion table when the average luminance value AL is 100.

In the example shown in FIG. 10(*a*), the average luminance value AL is 150, and α is set to be 3. In the example shown in FIG. 10(*b*), the average luminance value AL is 100, and α is set to be 1.5.

In this way, α is varied depending on the average luminance value AL, and the width by which the first output gradation value Ya is made lower than the input gradation value X, in the range lower than the peak luminance value MAXL is changed. Specifically, as the average luminance value AL is higher, α is made to assume a larger value, and the downward shift of the curve (polygonal line) is made larger. Accordingly, the gradation conversion characteristic is such that as the average luminance value AL is higher, the width by which the gradation value is lowered in the range lower than the peak luminance value MAXL is larger.

In the above description, the first conversion table generator 18 generates the first conversion table Ta, in the first method or the second method. The first conversion table generator 18 may generate the conversion table in a method other than the above-described methods. In any case, it is desirable that the first output gradation value Ya is made to be smaller than the input gradation value X in the range higher than 0 and lower than the peak luminance value MAXL.

In the case of the examples of the first conversion table Ta described above, the first output gradation value Ya is smaller than the input gradation value over the entire range higher than 0 and lower than the peak luminance value MAXL. However, it is sufficient if the first conversion table Ta has a feature that the first output gradation value Ya is smaller than the input gradation value X in at least part of the range higher than 0 and lower than the peak luminance value MAXL.

In the case of the above-described examples of the first conversion table Ta generated in either of the first method or the second method, the width by which the first output gradation value Ya is made lower than the input gradation value X within the range lower than the peak luminance value MAXL becomes larger as the average luminance value AL becomes higher.

The second conversion table generator 19 generates the second conversion table Tb based on the histogram HIST generated by the histogram generator 13 and the peak luminance value MAXL calculated by the peak luminance value calculator 14.

For example, the second conversion table generator 19 generates a normalized cumulative histogram NCH shown in FIG. 11(*a*) from the histogram exemplified in FIG. 2, and generates the second conversion table Tb exemplified in FIG. 11(*b*) from the normalized cumulative histogram NCH. In FIG. 11(*b*), the horizontal axis represents the input gradation value X, and the vertical axis represents the output gradation value Yb.

The normalized cumulative histogram NCH is obtained by normalizing a cumulative histogram CH obtained from the histogram HIST. The normalization of the cumulative histogram CH mentioned here is a process of modifying the cumulative value (cumulative frequency) FC(C) to take a value within the range of from the smallest gradation value (0) to the largest gradation value (255) which can be assumed by the peak luminance value MAXL.

The cumulative histogram CH represents, for each class C of the histogram HIST, a cumulative value (cumulative frequency) CF(C) of the frequency of occurrence F(C) from the smallest class to the particular class C.

The normalized value of the cumulative value (normalized cumulative frequency) NCF(C) is a value obtained by dividing the cumulative value CF(C) by the number of pixels within the screen (the number of pixels forming the screen), and multiplying the result of the division by the peak luminance value MAXL.

The normalized cumulative histogram NCH in FIG. 11(*a*) is represented by a curve connecting the points representing the normalized cumulative frequency NCF(C) for the respective classes. The point representing the normalized cumulative frequency NCF(C) for each class C is indicated at a position in the horizontal axis direction of a representative value, for example an intermediate value (midpoint in the horizontal axis direction). The intersection of such a curve with a vertical straight line passing the position of each maximum component value M on the horizontal axis can be regarded as representing the normalized cumulative frequency NCF(M) corresponding to the particular maximum component value M.

Incidentally, the above mentioned "curve" may be formed of a polygonal line exemplified in FIG. 11(*a*), or may be a continuous curve.

Figure 11A:
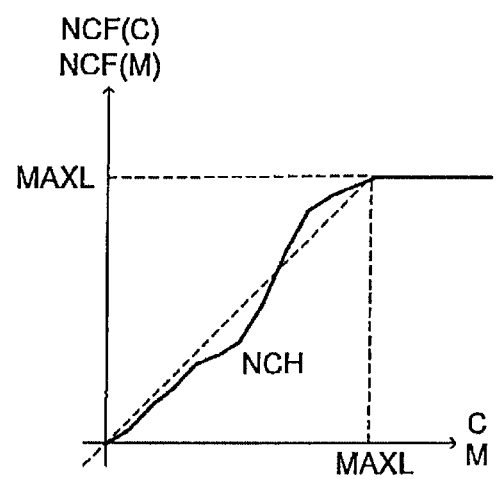
FIGS. 11($a$) and 11($b$) are diagrams for explaining the operation of a second conversion table generator.
Figure 11B:
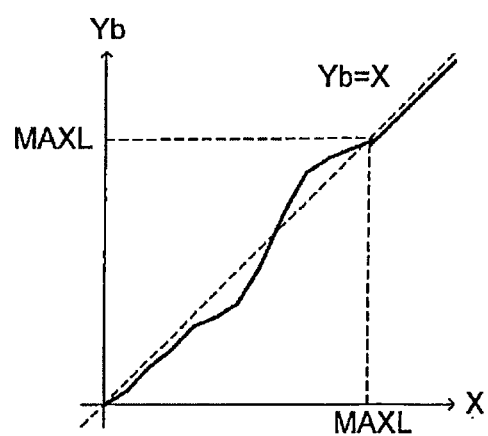

The second conversion table Tb shown in FIG. 11(b) has a gradation conversion characteristic that, in the range where the input gradation value X is not larger than the peak luminance value MAXL (more specifically, in the range up to the class to which the peak luminance value MAXL belongs), the second output gradation value Yb is equal to the normalized cumulative frequency value NCF(M) which is a value of the normalized cumulative histogram NCH shown in FIG. 11(a), and, in the range where the input gradation value X is larger than the peak luminance value MAXL (in the range larger than the class to which the peak luminance value MAXL belongs), the second output gradation value Yb is equal to the input gradation value X.

That "the second output gradation value Yb is equal to the value NCF(M) of the normalized cumulative histogram NCH" means that the output gradation value Yb corresponding to the input gradation value X which is equal to a certain maximum component value M of the normalized cumulative histogram NCH is equal to the value NCF(M) of the normalized cumulative histogram NCF corresponding to the above-mentioned certain maximum component value M.

Description has been made tor a case in which the histogram HIST is a histogram of the maximum component value M. Even when the histogram HIST is a histogram of the luminance value, the second conversion table Tb can be generated in a manner similar to that explained above. When the histogram HIST is a histogram of the luminance value, "maximum component value" in the above description needs to be changed to "luminance value".

It can be said that the histogram HIST shown in FIG. 2 represents a distribution function of the maximum component value M, and the value of the normalized cumulative histogram NCH shown in FIG. 11(a), that is, the normalized cumulative frequency NCF(M), represents the cumulative density function of the maximum component value M.

The second conversion table Tb generated in the manner described above has a feature that the peak luminance value is maintained, and the variation in the second output gradation value Yb against the variation in the input gradation value X is relatively large (the gradient of the curve representing the gradation conversion characteristic is relatively large) in the gradation value range where the frequency of occurrence of the gradation values is high (the gradation value range in which the gradation values (the maximum component values M, the luminance values, or the like) are included with a large proportion), and the variation in the second output gradation value Yb against the variation in the input gradation value X is relatively small (the gradient of the curve representing the gradation conversion characteristic is relatively small) in the gradation value range where the frequency of occurrence of the gradation values is low (the gradation value range in which the gradation values (the maximum component values M, the luminance values, or the like) are included with a large proportion). Accordingly, the contrast in the gradation value range where the frequency of occurrence of the gradation values is high can be enlarged, while the contrast in the gradation value range where the frequency of occurrence of the gradation values is low can be reduced.

In the case of the example of the second conversion table Tb described above, the second output gradation value Yb assumes a value NCF(M) of the cumulative density function when the input gradation value X is not larger than the peak luminance value MAXL. However, this does not impose a limitation to the present embodiment. For example, upper and lower limits may be set for the gradient of the cumulative density function. Such a measure can prevent the contrast in the gradation value range where the frequency of occurrence of the gradation values is high from becoming too large, and the contrast in the gradation value range where the frequency of occurrence of the gradation values is low from becoming too small.

In summary, it is sufficient it the second conversion table Tb generated by the second conversion table generator 19 has such a feature by which the peak luminance value is maintained, the contrast in the gradation value range where the frequency of occurrence of the gradation values is high is increased, and the contrast in the gradation value range where the frequency of occurrence of the gradation values is low is decreased.

The third conversion table Tc stored in the non-conversion table storage 20 is a table of which the third output gradation value Yc is equal to the input gradation value X, i.e., a non-conversion table. For example, the third conversion table Tc is prepared in advance, and stored in the non-conversion table storage 20.

The conversion table combiner 21 generates the conversion table T based on the comparison result RC, the first conversion table Ta, the second conversion table Tb, and the third conversion table Tc.

First, when the comparison result RC indicates that the average luminance value AL is lower than the threshold value ALth, the conversion table combiner 21 selects the third conversion table Tc and outputs the third conversion table Tc as the conversion table T. As a result, a conversion table of which the combined output gradation value Y is equal to the input gradation value X is outputted. The conversion table of which the combined output gradation value Y is equal to the input gradation value X is a conversion table by which the input gradation value X becomes the combined output gradation value Y without change, i.e., a conversion table by which no substantial gradation conversion is effected.

Such is done because, when the average luminance value AL is lower than the threshold value ALth, the power consumption is small, so that the power saving effect obtained by the conversion is limited.

Incidentally, it is not necessary to generate the first conversion table Ta and the second conversion table Tb when the average luminance value AL of the input image is lower than the threshold value ALth. Therefore, the arrangement may be such that the comparison result RC indicating that the average luminance value AL of the input image is lower than the threshold value ALth is sent from the comparator 17 to the first conversion table generator 18 and the second conversion table generator 19, whereby the generation of the conversion tables Ta and Tb at the first conversion table generator 18 and the second conversion table generator 19 is controlled to be omitted.

When the comparison result RC indicates that the average luminance value AL is equal to or higher than the threshold value ALth, the conversion table combiner 21 superimposes the first conversion table Ta with the second conversion table Tb to generate the conversion table T.

In the following description, it is assumed that, as the first conversion table Ta, a table having the gradation conversion characteristic shown in FIG. 5 is generated, and, as the second conversion table Tb, a table having the gradation conversion characteristic shown in FIG. 11(b) is generated.

Figure 12A:
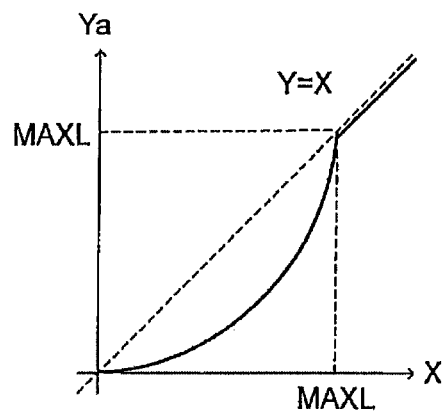
FIGS. 12($a$) to 12($c$) are diagrams for explaining the operation of a conversion table combiner.
Figure 12B:
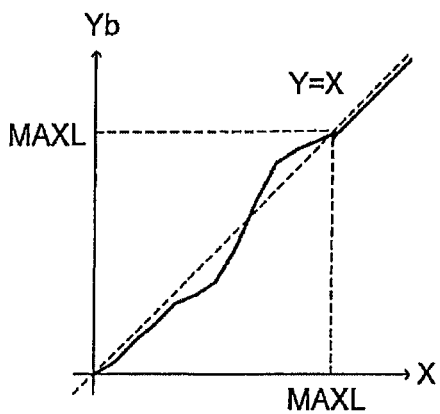

FIG. 12(a) shows a gradation conversion characteristic identical to that shown in FIG. 5, and FIG. 12(b) shows a gradation conversion characteristic identical to that shown in FIG. 11(b).

The superimposition of the first conversion table Ta with the second conversion table Tb is achieved by multiplying together the first output gradation value Ya(X) and the second output gradation value Yb(X) corresponding to the same input gradation value X, and dividing the result of the multiplication by the maximum value within the range of values which can be assumed by the output gradation values. This process is shown by the following formula (3).

[Mathematical Expression 3]

$$Y(X)=Ya(X) \times Yb(X)/Y \max \qquad \text{Formula (3)}$$

In the formula (3), Y max is the maximum value (255) within the range of values which can be assumed by Ya, Yb and Y.

The above-explained process is equivalent to normalization of the first output gradation value Ya and the second output gradation value Yb to make them assume a value of from 0 to 1, the multiplication of the normalized first output gradation value by the normalized second gradation value, and inverse normalization of the result of the multiplication to make it assume a value of from 0 to 255.

Figure 12C:
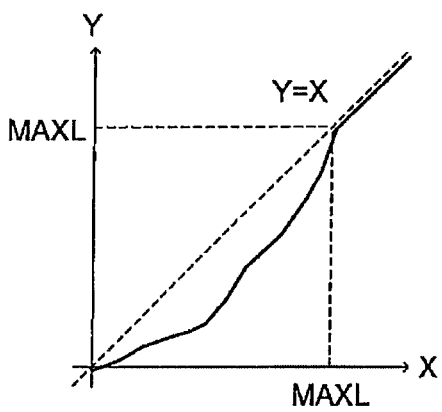

FIG. 12(c) shows an example of the conversion table T obtained by superimposing the first conversion table Ta with the second conversion table Tb.

The image converter 16 performs gradation conversion on the input image Da using the conversion table T generated by the conversion table generator 15, to generate the output image Db.

The conversion table generator 15 generates the conversion table T for each frame, and the conversion table T generated for each frame is used for the gradation conversion of the input image data Da of the particular frame.

The image converter 16 holds the conversion table T generated for the input image Da of each frame, until the gradation conversion on all the pixels of the image data Da of the particular frame is completed, and uses the conversion table T for the gradation conversion of each pixel.

Where the image data representing the input image Da has an R component value, a G component value, and a B component value, the gradation conversion may be performed separately for each of the R component value, the G component value, and the B component value; or, alternatively, the R component value, the G component value, and the B component value may be converted to a luminance component value, and color-difference component values, and the gradation of the luminance component value may be converted, and then inverse conversion into the R component value, the G component value, and the B component value may be performed.

The image display unit 3 performs image display based on the output image Db outputted from the image converter 16.

As has been described, when the average luminance value AL is not lower than the threshold value ALth, the conversion table T exemplified in FIG. 12(c) is used for the gradation conversion at the image converter 16.

The conversion table T obtained by superimposing the first conversion table Ta with the second conversion table Tb inherits the feature of the first conversion table Ta and also the feature of the second conversion table Tb.

Accordingly, as shown in the example of FIG. 12(c), inheriting the feature of the conversion table Ta, the conversion table T has a feature that, when the input gradation value X is equal to the peak luminance value MAXL, the combined output gradation value Y tends to be equal to the peak luminance value MAXL, and, in the range of higher than 0 and lower than the peak luminance value MAXL, the combined output gradation value Y tends to be smaller than the input gradation value X. As a result, the power consumption can be reduced, and, at the same time, the peak luminance value can be maintained.

Also, inheriting the feature of the first conversion table Ta, the conversion table T has a feature that, as the average luminance value AL becomes higher, the width by which the combined output gradation value Y is made lower than the input gradation value X in the range lower than the peak luminance value MAXL tends to become larger.

As a result, the power consumption can be reduced further, without damaging the visibility.

Moreover, inheriting the feature of the second conversion table Tb, the conversion table T has a feature that the variation in the combined output gradation value Y against the variation in the input gradation value X tends to be relatively large in the gradation value range where the frequency of occurrence of the gradation values is high, and the variation in the combined output gradation value Y against the variation in the input gradation value X tends to be relatively small in the gradation value range where the frequency of occurrence of the gradation values is low.

As a result, an image with a good contrast can be obtained.

Incidentally, the conversion table T need not satisfy all of the conditions stated above.

Figure 13:
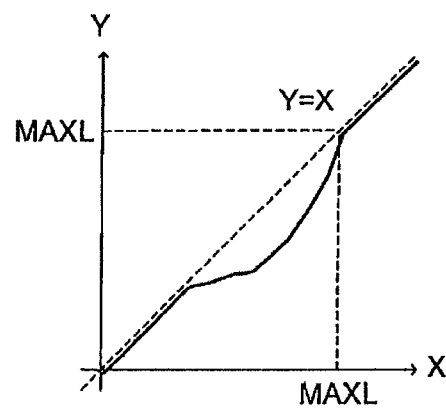
FIG. 13 is a diagram showing an example of a variation of a conversion table.

For example, the conversion table T shown in FIG. 12(c) has a feature by which, throughout the entire range in which the input gradation value X is higher than 0 and lower than the peak luminance value MAXL, the combined output gradation value Y is made to be smaller than the input gradation value X. However, the conversion table T may have such a gradation conversion characteristic that the combined output gradation value Y is smaller than the input gradation value X in part only of the range in which the input gradation value X is higher than 0 and lower than the peak luminance value MAXL, as shown in FIG. 13.

In summary, it is sufficient if the conversion table has such a gradation conversion characteristic that the combined output gradation value Y is smaller than the input gradation value X in at least part of the range in which the input gradation value X is higher than 0 and lower than the peak luminance value MAXL.

Also, in the above-described example, the third conversion table Tc stored in the non-conversion table storage 20 is selected when the average luminance value AL of the input image is lower than the threshold value ALth. This however is not essential. That is, the conversion table T obtained by superimposition of the first conversion table Ta with the second conversion table Tb may be used for the image conversion even when the average luminance value AL is lower than the threshold value ALth.

Part or the entirety of the image processing device 2 can be configured of processing circuitry.

For example, the functions of the various parts of the image processing device may be implemented by separate processing circuits, or the functions of a plurality of parts may be implemented all by a single processing circuit.

The processing circuitry may be formed of hardware or software, i.e., a programmed computer.

Part of the functions of the various parts of the image processing device may be implemented by hardware and the remaining part may be implemented by software.

Figure 14:
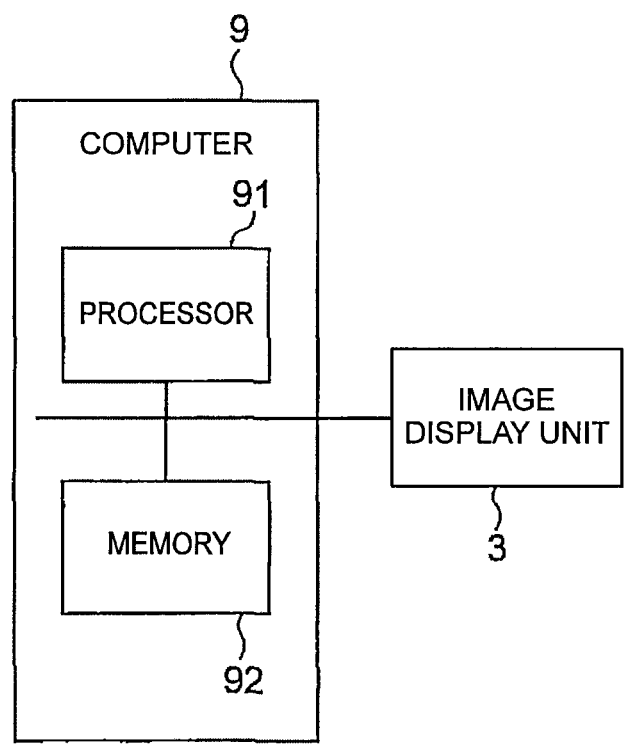
FIG. 14 is a block diagram showing a computer for implementing all the functions of the image processing device of the first embodiment, together with an image display unit.

FIG. 14 shows a computer 9 implementing all the functions of the image processing device 2, together with the image display unit 3.

In the illustrated example, the computer 9 includes a processor 91 and a memory 92.

The memory 92 stores programs for implementing the functions of the various parts of the image processing device 2.

For example, the processor 91 comprises a CPU (Central Processing Unit), a GPU (Graphics Processing Unit), a microprocessor, a microcontroller, a DSP (Digital Signal Processor), or the like.

For example, the memory 92 comprises a semiconductor memory such as a RAM (Random Access Memory), a ROM (Read Only Memory), a flash memory, an EPROM (Erasable Programmable Read Only Memory), or an EEPROM Electrically Erasable Programmable Read Only Memory), or a magnetic disc, an optical disc, or a magneto-optical disc, or the like.

The processor 91 and the memory 92 may be integrated into an LSI (Large Scale integration).

The processor 91 implements the functions of the image processing device by executing the programs stored in the memory 92.

The functions of the image processing device include the control over the display of the image display unit 3, as mentioned above.

The programs may be provided via a network, or may be provided being recorded in a recording medium, such as a non-transitory recording medium. That is, the programs may be provided as a program product.

Although the computer in FIG. 14 consists of a single processor, it may comprise two or more processors.

A procedure of processes performed by the processor 91 in a case in which the image processing device 2 of the first embodiment is formed of the computer in FIG. 14 will now be described with reference to FIG. 15.

Figure 15:
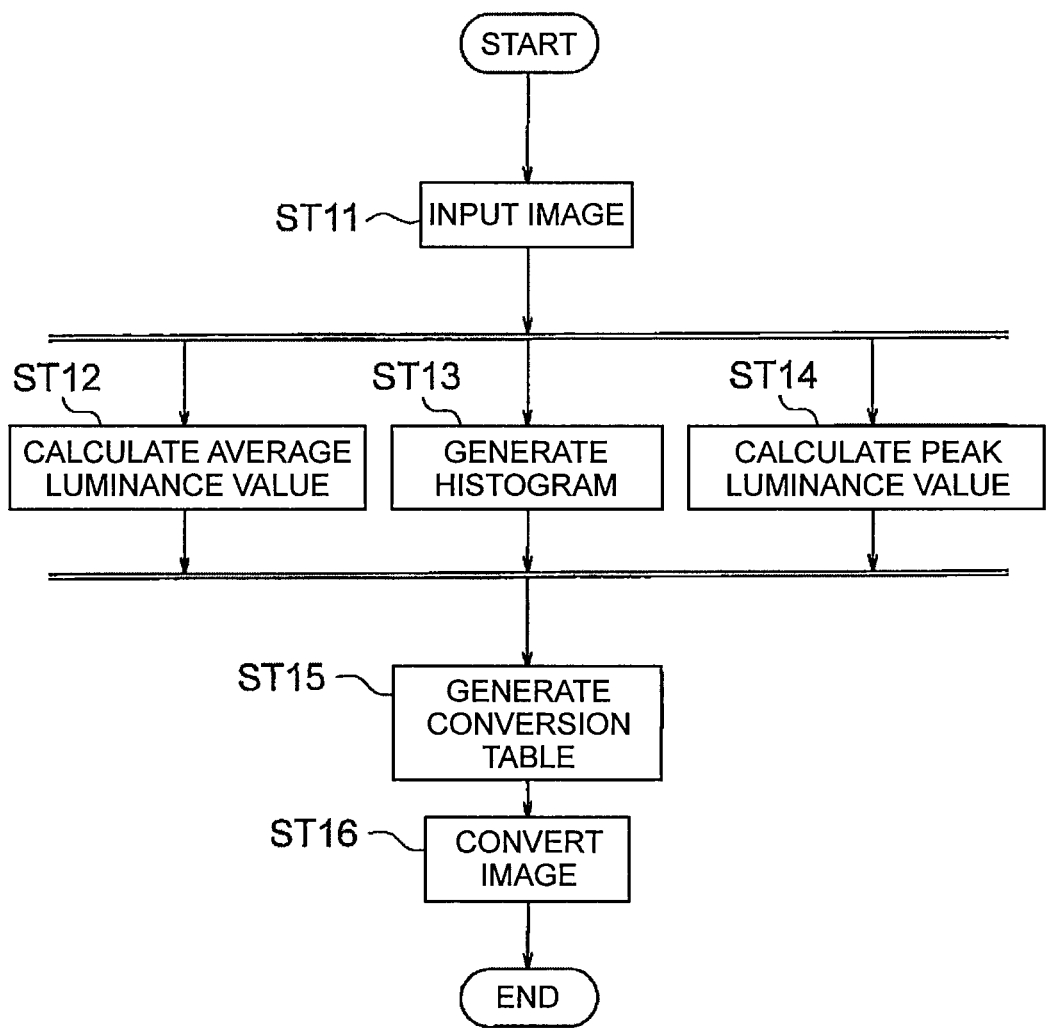
FIG. 15 is a flowchart showing a procedure of processes performed by a processor when the image processing device of the first embodiment is formed of the computer shown in FIG. 14.

The processes shown in FIG. 15 are performed each time one frame of the image is inputted.

In step ST11 in FIG. 15, an input process of the input image Da is performed. This process is similar to the process performed by the image input unit 11 in FIG. 1.

In step ST12, the average luminance value AL is calculated. This process is similar to the process performed by the average luminance value calculator 12 in FIG. 1.

In step ST13, the histogram HIST is generated. This process is similar to the process performed by the histogram generator 13 in FIG.

In step ST14, the peak luminance value MAXL is calculated. This process is similar to the process performed by the peak luminance value calculator 14 in FIG. 1.

The processes of steps ST12 to ST14 can be performed in parallel with each other.

In step ST15, the conversion table is generated. This process is similar to the process performed by the conversion table generator 15 in FIG. 1.

In step ST16, the image conversion is performed. This process is similar to the process performed by the image converter 16 in FIG. 1.

As has been described, according to the present first embodiment, it is possible to reduce the power consumption while maintaining the visibility, by using the conversion table by which, when the input gradation value is equal to the peak luminance value, the output gradation value is made to be also equal to the peak luminance value, and, in at least part of a range in which the input gradation value is higher than 0 and lower than the peak luminance value, the output gradation value is made to be smaller than the input gradation value.

Also, by using the conversion table by which, as the average luminance value AL is higher, the width by which the output gradation value is made lower than the input gradation value is made to be larger, the amount of reduction of the power consumption can be made larger as the power consumption is larger.

Moreover, by using the conversion table by which the output gradation value is made to be equal to the input gradation value when the average luminance value AL of the input image lower than the threshold value ALth, the visibility can be maintained even when the image is generally dark, and the power consumption is small even if the image conversion by the image converter 16 is not performed.

Furthermore, by using the conversion table by which the variation in the combined output gradation value Y against the variation in the input gradation value X is made to be relatively large in the gradation value range where the frequency of occurrence of the gradation values is high, and the variation in the combined output gradation value Y against the variation in the input gradation value X is made to be relatively small in the gradation value range where the frequency of occurrence of the gradation values is low, the contrast is higher in the gradation range where the frequency of occurrence of the gradation values is higher, and it is possible to maintain high gradation reproducibility throughout the image.

Second Embodiment

Figure 16:
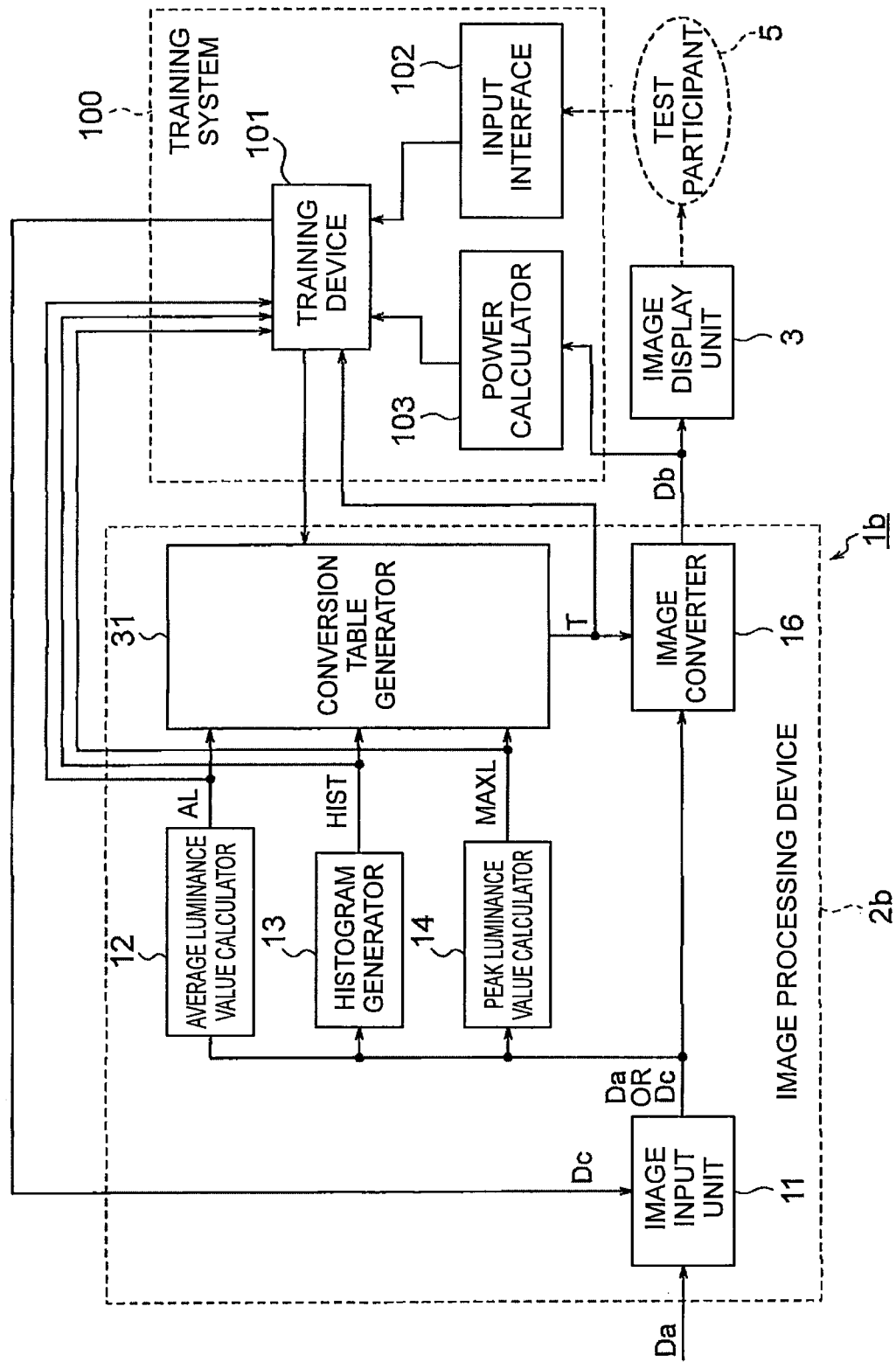
FIG. 16 is a functional block diagram showing an image processing device according to a second embodiment, and a training system.

FIG. 16 is a diagram showing a configuration of an image display apparatus 1b according to a second embodiment. FIG. 16 also shows a training system 100.

The image display apparatus 1b shown in FIG. 16 is generally identical to the image display apparatus 1 in FIG. 1. However, in place of the image processing device 2 in FIG. 1, an image processing device 2b is provided. The image processing device 2b is generally identical to the image processing device 2, but the conversion table generator 15 is replaced with a conversion table generator 31.

The conversion table generator 31 generates the conversion table T based on the average luminance value AL, the histogram HIST, and the peak luminance value MAXL of the input image Da. For example, the conversion table generator 31 is formed of a trained multilayer neural network 32 exemplified in FIG. 17.

The multilayer neural network 32 is a trained neural network which associates a combination of the average luminance value AL, the histogram HIST, and the peak luminance value MAXL, with the conversion table T, and has been generated as a result of machine learning to generate a desired conversion table T.

"A desired conversion table T" is a conversion table generated as a result of such training that, after the training, the conversion table satisfies predetermined conditions, and the visibility of the displayed image obtained by using the particular conversion is good, and the power consumption at the time when the particular conversion table is used is small.

For example, the above mentioned "predetermined conditions" include the following conditions (a) to (d).

(a) When the input gradation value X is equal to the peak luminance value MAXL, the output gradation value Y is also equal to the peak luminance value MAXL, and when the input gradation value X is in the range higher than 0 and lower than the peak luminance value MAXL, the output gradation value Y is smaller than the input gradation value X.

(b) The higher the average luminance value AL of the input image is, the larger the width by which the output gradation value Y is made lower than input gradation value X in the range lower than the peak luminance value MAXL is.

(c) When the average luminance value AL of the input image is lower than the threshold value ALth, the input gradation value X becomes the output gradation value Y without change.

(d) The variation in the output gradation value Y against the variation in the input gradation value X is relatively large in the gradation value range in which the frequency of occurrence of the gradation values in the input image is high, and the variation in the output gradation value Y against the variation in the input gradation value X is relatively small in the gradation value range in which the frequency of occurrence of the gradation values in the input image is low.

The visibility of the displayed image is determined by subjective evaluation by a plurality of test participants.

The power consumption at the image display unit 3 is obtained by calculation or measurement.

In summary, whether the conversion table T is desirable or not is judged based on whether the conversion table satisfies the above-mentioned conditions (a) to (d), and the result of the subjective evaluation on the displayed image obtained by displaying the output image Db generated by the image conversion using the particular conversion table T, and the power consumption at the image display unit 3 at the time of displaying the particular display image.

The multilayer neural network 32 has been generated as a result of the learning of a relation between the conversion table T generated by the particular neural network 32, and the above conditions (a) to (d), the visibility of the display image, and the power consumption.

Figure 17:
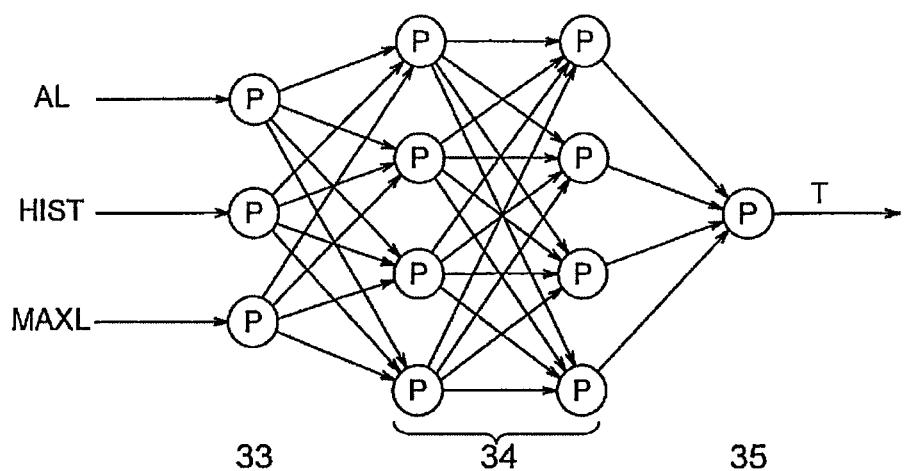
FIG. 17 is a diagram showing an example of a neural network forming a conversion table generator in FIG. 16.

The neural network 32 shown in FIG. 17 has an input layer 33, intermediate layers (hidden layers) 34, and an output layer 35. In the illustrated example, the number of the intermediate layers 34 is 3, but the number of the intermediate layers 34 may be 2 or less, or 4 or more.

Assigned to each of the neurons P in the input layer 33 is one of the average luminance value AL, the histogram HIST, and the peak luminance value MAXL of the input image. Inputted to each neuron is the assigned value.

The neurons in the input layer 33 output the input without change.

The neurons P in the output layer 35 output data defining the conversion table T. The data defining the conversion table T include the output gradation value Y corresponding to each input gradation value X.

Each of the neurons P in the intermediate layers 34 and the output layer 35 performs calculation represented by the following model formula on the plurality of inputs.

[Mathematica Expression 4]

$$y = s(w_1 \times x_1 + w_2 \times x_2 + \ldots + w_N \times x_N + b)$$ Formula (4)

In the formula (4);

N is the number of the inputs to the neuron P, and it is not necessarily identical between neurons.

$x_1$ to $x_N$ are input data to the neuron P, $w_1$ to $w_N$ are weights on the inputs $x_1$ to $x_N$, and b is a bias.

The weights and the bias are determined through learning.

In the following description, the weights and the bias are collectively called parameters (parameters of the neural network).

The function s(a) is an activation function.

The activation function may be a step function which outputs 0 when a is 0 or less, and otherwise outputs 1.

The activation function s(a) may be an ReLU function which outputs 0 when a is 0 or less, and otherwise outputs the input value a, or may be an identity function which outputs the input value a without change, or a sigmoid function.

As was mentioned above, the neuron in the input layer 33 outputs the input without change, so that the activation function used by the neuron in the input layer 33 may be said to be an identity function.

For example, the step function or the sigmoid function may be used in the intermediate layers 34, and the ReLU function may be used in the output layer. Also different activation functions may be used between different neurons in the same layer.

The number of the neurons P, and the number of layers (stages) are not limited to the example shown in FIG. 17.

As in the first embodiment, part or the entirety of the image processing device 2b of the second embodiment can be configured of processing circuitry.

For example, the functions of the various parts of the image processing device may be implemented by separate processing circuits, or the functions of a plurality of parts may be implemented all by a single processing circuit.

The processing circuitry may be formed of hardware or software, i.e., a programmed computer.

Part of the functions of the various parts of the image processing device may be implemented by hardware and the remaining part may be implemented by software.

For example, the image processing device 2b may be formed of the computer shown in FIG. 14.

A procedure of processes performed by the processor 91, in a case in which the image processing device 2b is formed of the computer in FIG. 14 will now be described with reference to FIG. 18.

Figure 18:
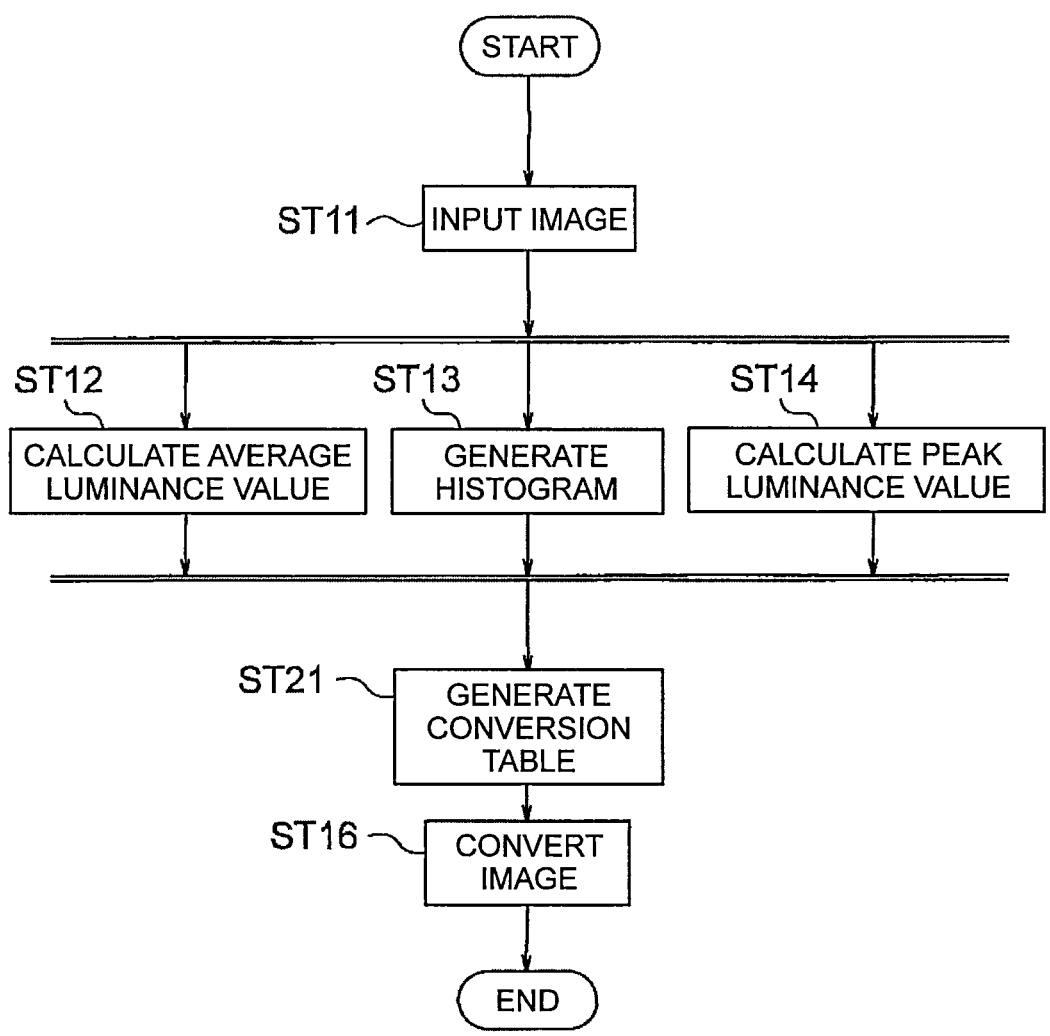
FIG. 18 is a flowchart showing a procedure of processes performed by the processor when the image processing device of the second embodiment is formed of the computer shown in FIG. 14.

FIG. 18 is generally identical to FIG. 15, but step ST15 is replaced with step ST21.

In step ST21, the conversion table T is generated. This process is similar to the process performed by the conversion table generator 31 in FIG. 16.

As was described above, the multilayer network 32 forming the conversion table generator 31 is generated by machine learning. As was mentioned before, FIG. 16 shows a training system 100 for the machine learning. At the time of the machine learning, the training system 100 is used, being connected to the image processing device 2b.

The training system 100 includes a training device 101, an input interface 102, and a power calculator 103.

The input interface 102 is used for input of the results of the subjective evaluation.

The subjective evaluation is made for a plurality of images and by a plurality of test participants 5.

The number of images used and the number of the test participants should be sufficient for proper learning.

It is desirable that the test participants 5 are the users of the image processing device 2b, or are such persons assumed to have taste or feelings similar to those of the users. The number of the test participants is desirably as large as possible, but is determined also taking account of the cost, the amount of data processing, the time required, and the like.

The training device 101 sequentially selects the plurality of images Dc, and supplies the selected image to the image input unit 11.

The plurality of images may be those stored internally of the training device or may be images supplied from the outside.

The contents of the plurality of images are different from each other.

The contents of the images referred herein mean the elements forming the image, the arrangement of the elements, the brightness within the screen, the distribution of the colors, and the like. Between different images, at least one of the above-mentioned items is different.

The image processing device 2b performs processes on the input image Dc, the processes performed being identical to those in the ordinary image processing operation, and causes the image display unit 3 to display the image.

That is, the average luminance value calculator 12 calculates the average luminance value AL, the histogram generator 13 generates the histogram HIST, and the peak luminance value calculator 14 calculates the peak luminance value MAXL.

The conversion table generator 31 generates the conversion table T based on the average luminance value AL, the histogram HIST, and the peak luminance value MAXL.

The image converter 16 performs the image conversion on the image Dc (image for the training) being inputted to the image input unit 11, using the conversion table T generated by the conversion table generator 31, and causes the output image Db obtained by the conversion to be displayed on the image display unit 3.

Each of the test participants 5 inputs the result of the evaluation on the displayed image using the input interface 102.

The evaluation on each image by each test participant may be one indicating whether the image is satisfactory or not, or a numerical value indicating the degree of satisfaction.

A subjective evaluation value by the plurality of test participants and on the plurality of images for training is determined by combining the results of evaluation by the individual test participants or the respective images.

When the subjective evaluation on each image is an indication of whether the image is satisfactory or not, the proportion occupied by the indication of satisfaction may be used as the subjective evaluation value for the plurality of images.

If the subjective evaluation for each image is a degree of satisfaction, the total or the average of the degree of satisfaction over the plurality of images may be used as the subjective evaluation value for the plurality of images.

The power calculator 103 calculates the power consumption at the image display unit 3 when the image Db converted using the conversion table T generated by the conversion table generator 31 is displayed. For example, the power calculator 103 calculates the power consumption at the image display unit 3 based on the converted image Db outputted from the image converter 16.

The training device 101 receives the average luminance value AL calculated by the average luminance value calculator 12, the histogram HIST generated by the histogram generator 13, the peak luminance value MAXL calculated by the peak luminance calculator 14, and the conversion table T generated by the conversion table generator 31, and, based on the received data, makes judgement as to whether the conversion table T satisfies the above-mentioned conditions (a) to (d). The judgement as to whether the conditions (a), (c), and (d) are satisfied is made for each image. The judgement as to whether the condition (b) is satisfied is made after the generation of the conversion tables T for all the images.

Also, the training device 101 makes overall evaluation based on the results of the subjective evaluation inputted by means of the input interface 102, and the power consumption calculated by the power calculator 103.

For example, the training device 101 calculates the subjective evaluation value based on the results of the subjective evaluation for the plurality of images by the plurality of test participants.

Also, the training device 101 calculates a power saving evaluation value based on the power consumption calculated by the power calculator 103.

The power consumption is also calculated for each of the plurality of images.

The power saving evaluation value for the plurality of images is determined from a total or an average of the power consumption for each image, over the plurality of images.

The smaller the power consumption is, the larger the power saving evaluation value is.

Furthermore, the training device 101 calculates an overall evaluation value based on the subjective evaluation value and the power saving evaluation value. For example, the overall evaluation value is determined by weighted addition of the subjective evaluation value and the power saving evaluation value.

Based on the results of the judgement as to whether the conditions (a) to (d) are satisfied, and the calculated overall evaluation value, the training device 101, if required, adjusts the set of parameters (set of parameters of the neural network) PS.

For example, the training device 101 changes the set of parameters PS when the above conditions (a) to (d) are not satisfied. The change is so made that the conditions (a) to (d) become satisfied.

Also, the training device 101 judges whether or not the overall evaluation value EV is equal to or more than a predetermined threshold value EVth, and changes the set of parameters PS if the overall evaluation value EV is less than the threshold value EVth. The change is so made that the overall evaluation value EV becomes larger.

A gradient descent method may be used for the change.

Using the multilayer neural network 32 having its set of parameters PS changed in the manner described above, the training device 101 performs the above-described sequence of processes again.

If the conversion table satisfies the above-mentioned conditions (a) to (d), and the calculated overall evaluation value EV is not less than the threshold value EVth, the set of parameters used for the generation of the conversion table is adopted as optimum parameters. In the subsequent image processing on the input image Da, the neural network 32 formed of such optimum parameters is used as one forming the conversion table generator 31.

As has been described, the set of parameters PS of the neural network 32 forming the conversion table T is determined as a result of learning, and in this way, the neural network 32 is formed.

The judgement as to whether the above-mentioned condition (a) is satisfied is made for each image, based on the conversion table T generated by the conversion table generator 31, and the peak luminance value MAXL calculated by the peak luminance value calculator 14.

The judgement as to whether the above-mentioned condition (b) is satisfied is made by comparing the relation between the conversion table T generated by the conversion table generator 31 and the average luminance value AL calculated by the average luminance value calculator 12, among all the images.

The judgement as to whether the above-mentioned condition (c) is satisfied is made for each image based on the conversion table T generated by the conversion table generator 31 and the average luminance value AL calculated by the average luminance value calculator 12.

The judgement as to whether the above-mentioned condition (d) is satisfied is made for each image based on the conversion table T generated by the conversion table generator 31 and the histogram HIST generated by the histogram generator 13.

The training device 101 may be formed of a computer. When the image processing device 2 is formed of a computer, the training device 101 may be formed of the same computer. The computer forming the training device 101 may for example be as shown in FIG. 14. In such a case, the functions of the training device 101 may be implemented by having a program stored in the memory 92 to be executed by the processor 91.

In the generation of the neural network by means of the training device 101, first, a neural network which serves as an origin is prepared. That is, the conversion table generator 31 is tentatively constructed of a network which serves as an origin. This neural network is similar to the neural network shown in FIG. 17.

In the generation of the neural network, it is necessary to determine the values of the parameters (weights and a bias) for each of the plurality of neurons. A collection of parameters for the plurality of neurons is called a set of parameters, and is denoted by a reference sign PS.

In the generation of the neural network, optimization of the set of parameters PS is performed such that the conversion table formed using the neural network serving as the origin is so modified as to satisfy the above-mentioned conditions (a) to (d), and the above-mentioned overall evaluation value EV becomes equal to or more than the threshold value EVth. The optimization can be performed by, for example, an error back-propagation method.

Specifically, the training device 101 prepares a plurality of images, sets initial values of the set of the parameters PS, selects the above-mentioned images in turn, acquires the average luminance value AL, the histogram HIST, the peak luminance value MAXL, the conversion table T, the results of the subjective evaluation by the plurality of test participants, and the calculated value of the power consumption, when the selected image is inputted.

The training device 101 judges whether the above-mentioned conditions (a) to (d) are satisfied based on the average luminance value AL, the histogram HIST, the peak luminance value MAXL, and the conversion table T having been acquired.

The training device 101 also calculates the overall evaluation value EV based on the results of the subjective evaluation and the calculated values of the power consumption having been acquired.

If the above-mentioned conditions (a) to (d) are not satisfied, or the calculated overall evaluation value EV is less than the threshold value EVth, the set of parameters PS is changed such that the conditions (a) to (d) become satisfied or the overall evaluation value EV is increased.

The above-described processes are repeated until the conditions (a) to (d) are satisfied, and the overall valuation value EV becomes equal to or more than the threshold value EVth.

The change of the set of parameters PS can be made using a gradient descent method.

When the learning is completed, the input interface 102 is disconnected, and the image display apparatus is used in a state in which the input interface 102 is disconnected.

The training device 101 and the power calculator 103 may be disconnected after the completion of the learning, or may be left connected.

Specifically, when the functions of the training device 101 and the power calculator 103 are implemented by execution of a program by the processor 91, the program may be left stored in the memory 92.

A procedure of processes performed by the processor 91 when the above-mentioned training device 101 and power calculator 103 are formed of the computer in FIG. 14 will now be described with reference to FIG. 19 and FIG. 20.

Figure 19:
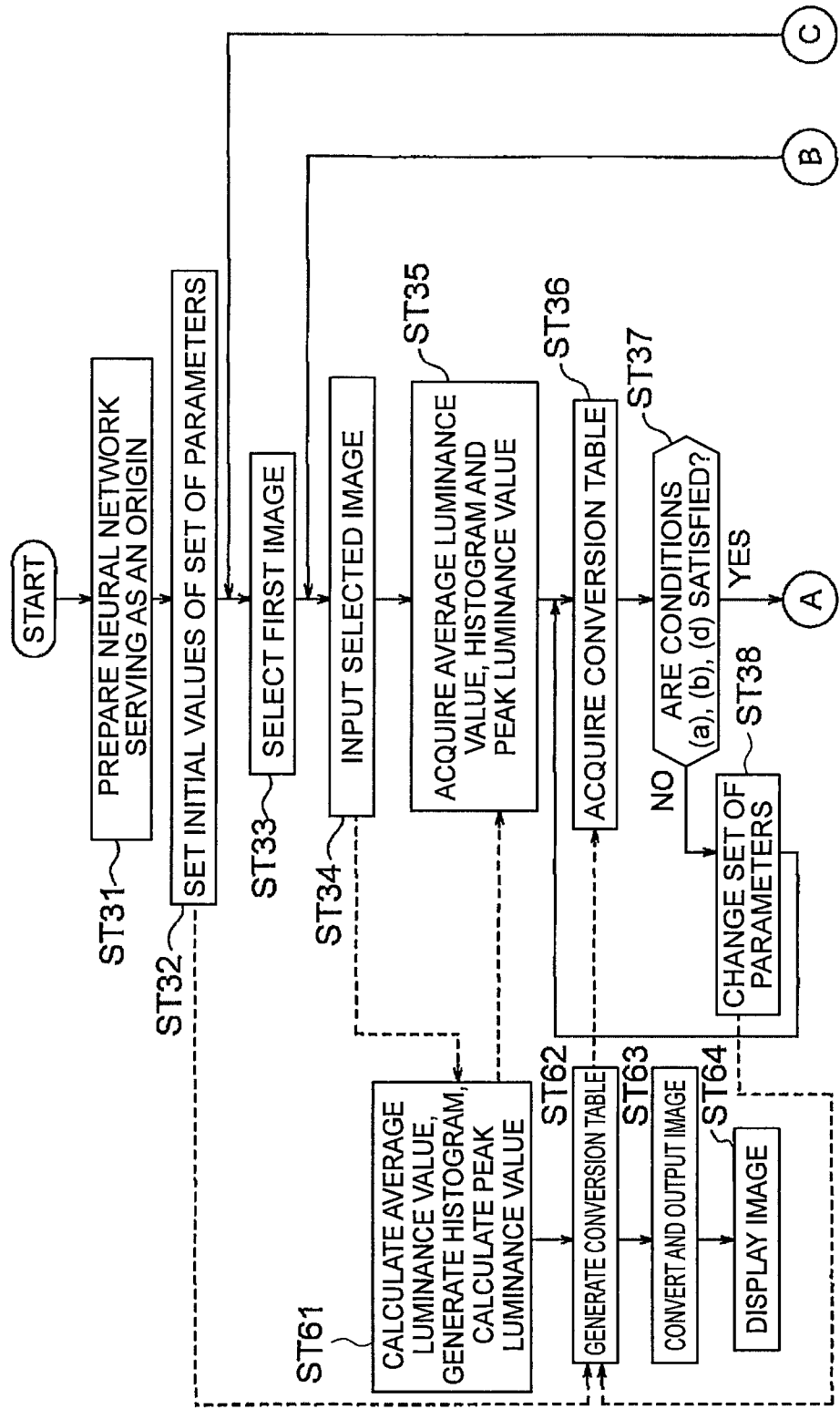
FIG. 19 is a flowchart showing a part of a procedure of processes for the training of the neural network in FIG. 17.

Incidentally, in FIG. 19, the processes performed by the image processing device 2b and image display unit 3 are also shown as steps ST61 to ST62. In FIG. 19, exchange of signals or data between the training device 101 and the image processing device 2b is indicated by dotted lines.

In step ST31 in FIG. 19, the training device 101 prepares a neural network which serves as an origin. That is, the conversion table generator 31 is tentatively constructed of a neural network which serves as an origin.

This neural network is similar to the neural network shown in FIG. 17.

In step ST32, the training device 101 sets the initial values of the set of parameters (weights and a bias) PS used in the calculation at each of the neurons in the intermediate layers and the output layer of the neural network prepared in step ST31.

The initial values may be values randomly selected or may be values which are predicted to be optimum.

In step ST33, the training device 101 selects one image, i.e., a first image, among the plurality of images prepared in advance.

In step ST34, the training device 101 inputs the selected image into the image input unit 71.

The image processing device 2b processes the inputted image as follows. The average luminance value calculator 12 calculates the average luminance value AL, the histogram generator 13 generates the histogram HIST, the peak Luminance value calculator 14 calculates the peak luminance value MAXL, in step ST61; the conversion table generator 31 generates the conversion table T in step ST62, and the image converter 16 performs the image conversion using the generated conversion table T, in step ST63. The output image Db obtained by the image conversion is displayed by the image display unit 3 in step ST64.

In step ST35, the training device 101 acquires the average luminance value AL, the histogram HIST, and the peak luminance value MAXL calculated or generated in step ST61.

In step ST36, the training device 101 acquires the conversion table T generated in step ST62.

In step ST37, the training device 101 judges whether the conditions (a), (c), and (d) are satisfied based on the average luminance value AL, the histogram HIST, and the peak luminance value MAXL acquired in step ST35, and the conversion table T acquired in step ST36.

If the conditions are not satisfied, the processing proceeds to step ST38.

In step ST38, the training device 101 changes the set of parameters PS. This change is so made that the conversion table generated by the conversion table generator 31 becomes to satisfy the above-mentioned conditions (a), (c), and (d).

After the processes of step ST38, the conversion table generator 31 in the image processing device 2*b* generates the conversion table T (ST62) again using the neural network with its set of parameters PS having been changed, the image converter 16 performs the image conversion (ST63) using the generated conversion table T, and the image display unit 3 displays the output image Db (ST64) generated by the image conversion.

After the processes of step ST38, the training device 101 waits until the conversion table T is generated again in step ST62, and, when generated again, repeats the processes of step ST36 and subsequent steps.

Figure 20:
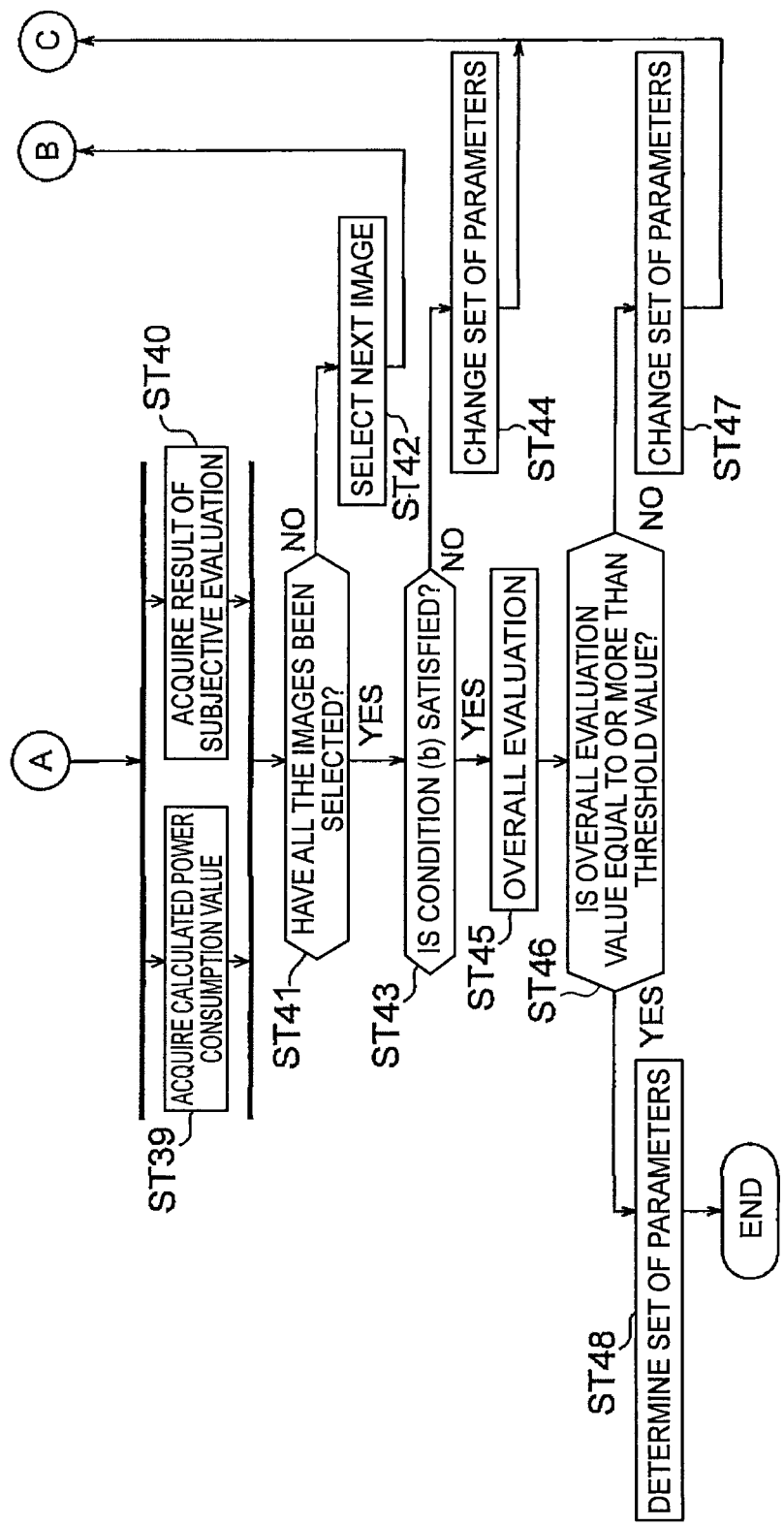
FIG. 20 is a flowchart showing another part of the procedure of processes for the training of the neural network in FIG. 17.

If, in step ST37, the conditions (a), (c), and (d) are satisfied, the processes of steps ST39 and ST40 in FIG. 20 are performed.

In step ST39, the training device 101 acquires the result of calculation of the power consumption at the image display unit. The power consumption acquired here is power consumption when displaying the image obtained by converting the input image using the generated conversion table T, and is calculated by the power calculator 103.

In step ST40, the training device 101 acquires subjective evaluation pertaining to the displayed image.

The subjective evaluation is the evaluation by the test participants on the displayed image, and has been inputted by means of the input interface 102. Here, it is assumed that when one image is displayed, the plurality of test participants input the results of the subjective evaluation in turn.

The processes of step ST39 and the processes of step ST40 may be performed in parallel.

Incidentally, the processes (ST39) of acquiring the calculated value of the power consumption include instructing the power calculator 103 to calculate the power consumption, and waiting for the input of the calculated value of the power consumption calculated by the power calculator 103 responsive to the instruction.

Similarly, the processes (ST40) of acquiring the results of the subjective evaluation include outputting information (audio information or video information) guiding the test participants to input the results of the subjective evaluation, and waiting for the input of the results of the subjective evaluation by the test participants following the guidance.

In step ST41, the training device 101 judges whether or not the processes of steps ST34 to ST40 have been completed for all of the above-mentioned plurality of images.

If the above-mentioned processes have not been completed for all of the plurality of images, a next image is selected in step ST42. As the next image, an image which has not been selected, among the plurality of image prepared in advance is selected. After step ST42, the processing returns to step ST34.

If the above-mentioned processes have been completed for all of the plurality of images, the processing proceeds to step ST43.

In step ST43, the training device 101 judges whether the condition (b) is satisfied or not.

If it is not satisfied, then in step ST44, the training device 101 changes the set of parameters PS. This change is so made that the conversion table T generated by the neural network becomes to satisfy the condition (b).

If, in step ST43, the condition (b) is satisfied, then, in step ST45, the training device calculates the overall evaluation value, and, next in step ST46, the training device 101 judges whether or not the overall evaluation value EV is equal to or more than the threshold value EVth.

If, in step ST46, the overall evaluation value EV is less than the threshold value EVth, the processing proceeds to step ST47.

In step ST47, the training device 101 changes the set of parameters PS.

The change is so made that the overall evaluation value becomes larger.

A gradient descent method may be used for the change.

After the change of the set of parameters PS in step ST44 or step ST47, the processing returns to step ST33.

If, in step ST46, the overall evaluation value EV is equal to or more than the threshold value EVth, the processing proceeds to step ST48.

In step ST48, the training device 101 adopts the set of parameters PS having been set or changed, as an optimum set of parameters. That is, if step ST48 is reached without undergoing any of steps ST38, ST44 and step ST47, the set of parameters PS set in step ST32 is adopted as the optimum set of parameters. If step ST48 is reached after undergoing steps ST38, ST44 or ST47, the set of parameters PS having been changed in the processes in the immediately preceding step ST38, ST44 or ST47 is adopted as the optimum set of parameters PS.

This completes the processes of generating the neural network.

That is, the conversion table generator 31 becomes one formed of the neural network generated in the above-described processes.

In the example described above, the calculated value of the power consumption is acquired in step ST39. Alternatively, a measured value of the power consumption may be acquired. The measured value may be one obtained by a power measurement unit not illustrated.

In the example described above, it is so arranged that when one image is displayed, the plurality of test participants sequentially input the results of the subjective evaluation. Alternatively, the arrangement may be such that while each of the plurality of test participants is watching the images displayed on the image display unit 3, the processes of steps ST33 to ST42 are performed. That is, the arrangement may be such that the plurality of images are sequentially displayed to each test participant, and the particular test participant inputs the result of evaluation for each of the displayed images.

In the example described above, the table is formed in such a manner that all of the conditions (a) to (d) are satisfied.

The table may be one which does not satisfy one or more of the conditions (b), (c), and (d).

In a case in which the condition (b) need not be satisfied, the processes of steps ST43 and ST44 can be omitted.

Figure 21:
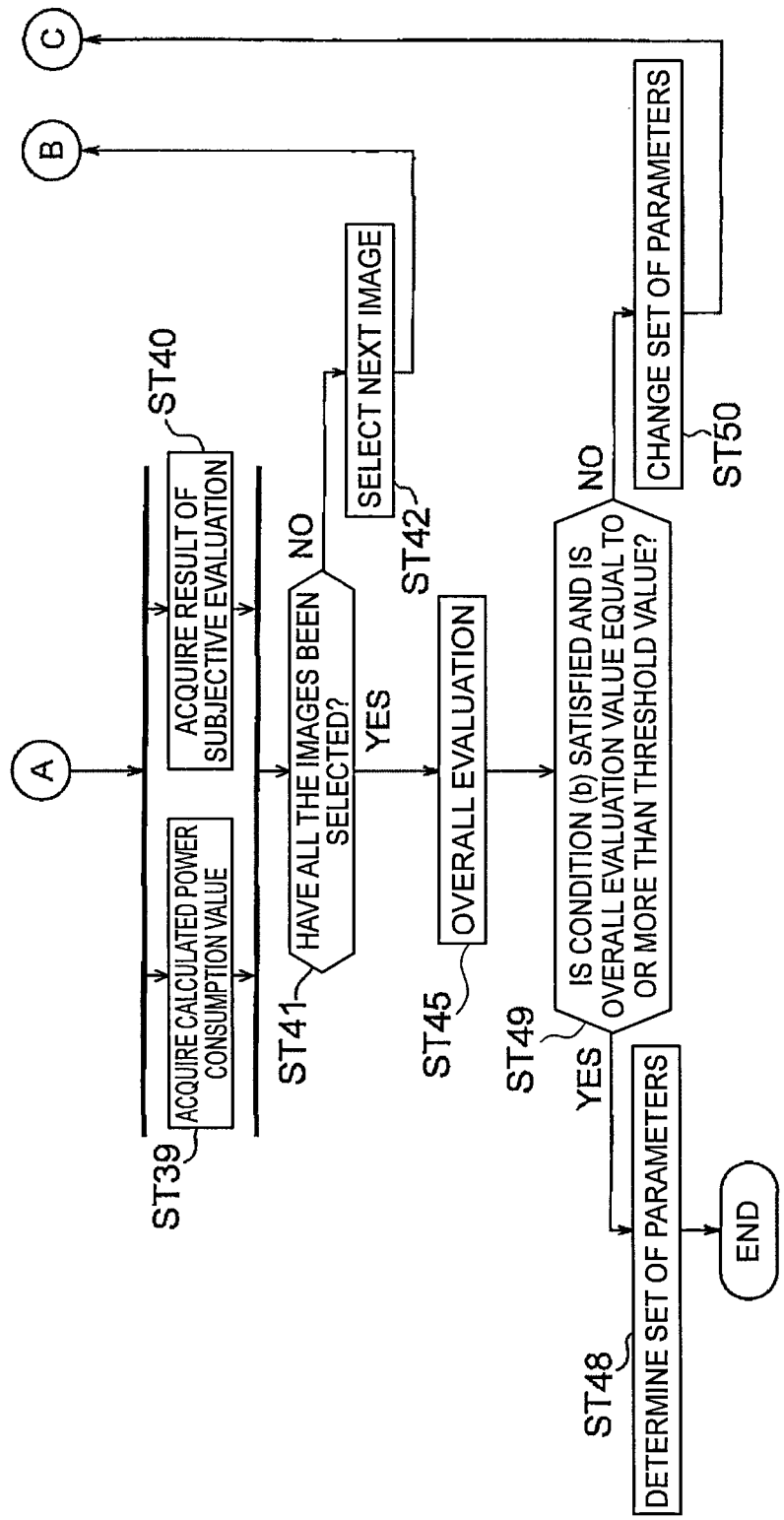
FIG. 21 is a flowchart showing an example of a variation of the procedure of processes shown in FIG. 20.

The processes in and after step ST41 in FIG. 20 may be performed in a procedure shown in FIG. 21.

That is, if, in step ST41, the above-described processes have been completed for all of the plurality of images, the processing proceeds to step ST45.

In step ST45, the training device 101 calculates the overall evaluation value.

In next step ST49, the training device 101 judges whether the condition (b) is satisfied, and the overall evaluation value EV is equal to or more than the threshold value EVth.

If the condition (b) is not satisfied, or the overall evaluation value EV is less than the threshold value EVth, the processing proceeds to step ST50.

In step ST50, the training device 101 changes the set of parameters PS.

The change is so made that the condition (b) becomes satisfied and the overall evaluation value becomes larger.

A gradient descent method may be used for the change.

After the change of the set of parameters PS in step ST50, the processing returns to step ST33.

If, in step ST49, the condition (b) is satisfied, and the overall evaluation value EV is equal to or more than the threshold value EVth, the processing proceeds to step ST48.

In step ST48, the training device 101 adopts the set of parameters PS having been set or changed, as the optimum set of parameters. That is, if the step ST48 is reached without undergoing either of step ST38 and step ST50, the set of parameters PS set in step ST32 is adopted as the optimum set of parameters. If the step ST48 is reached after undergoing step ST38 or ST50, the set of parameters PS having been changed in the immediately preceding step ST38 or ST50 is adopted as the optimum set of parameters.

With the second embodiment, effects similar to those of the first embodiment can be obtained. Also, the conversion table generator 31 is automatically constructed, so that the time and labor required for designing the conversion table generator 31 can be saved. Moreover, it is possible to generate a conversion table optimum for the image display unit 3 connected to the image processing device 2b, with the result that a maximum power saving can be achieved while maintaining the visibility of the image.

Various variations can be applied to the embodiments described above. For example, the variations explained in connection with the first embodiment can also be applied to the second embodiment as long as no contradiction occurs.

So far, the image processing device and image display apparatus have been explained. It is also possible to perform an image processing method using the image processing device having been described, and it is also possible to cause a computer to execute the processes in the image processing device or the image processing method by means of a program.

REFERENCE SIGNS

1: image display apparatus; 2, 2b: image processing device; 3: image display unit; 11: image input unit; 12: average luminance value calculator; 13: histogram generator; 14: peak luminance value calculator; 15: conversion table generator; 16: image converter; 17: comparator; 18: first conversion table generator; 19: second conversion table generator; 20: non-conversion table storage; 21: conversion table combiner; 23 parameter determining unit; 24: table value calculator; 31: conversion table generator; 32: neural network; 33: input layer; 34: intermediate layer; 35: output layer.

What is claimed is:

1. An image processing device generating an output image based on an input image, and supplying the output image to a self-light emission image display, said image processing device having processing circuitry:

to calculate an average luminance value of said input image;

to generate a histogram representing a frequency of occurrence of gradation values of said input image for each class;

to calculate a peak luminance value of said input image;

to generate a conversion table defining a relation between a gradation value of said input image and a gradation value of said output image based on said average luminance value, said histogram and said peak luminance value; and to generate said output image by converting said input image using said conversion table;

wherein said processing circuitry compares said average luminance value with a predetermined threshold value;

when said average luminance value is lower than said threshold value, said processing circuitry generates, as said conversion table, a conversion table by which the gradation value of said input image is made to become the gradation value of said output image without change;

when said average luminance value is not lower than said threshold value, said processing circuitry generates, as said conversion table, a conversion table by which, when the gradation value of said input image is equal to said peak luminance value, the gradation value of said output image is made to be also equal to said peak luminance value, and, in at least part of a range in which the gradation value of said input image is higher than 0 and lower than said peak luminance value, the gradation value of said output image is made to be smaller than the gradation value of said input image, and in a gradation value range where the frequency of occurrence of the gradation values in said input image is high, variation in the gradation value of said output image against variation in the gradation value of said input image is made to be relatively large, and, in a gradation value range where the frequency of occurrence of the gradation values in said input image is low, variation in the gradation value of said output image against variation in the gradation value of said input image is made to be relatively small;

said conversion table generated when said average luminance value is not lower than said threshold value is generated by superimposing a first conversion table with a second conversion table, said first conversion table defining a relation between the gradation value of said input image and a first output gradation value, and said second conversion table defining a relation between the gradation value of said input image and a second output gradation value;

said processing circuitry generates said first conversion table, by making said first output gradation value to be a value smaller than the gradation value of said input image, in at least part of a range in which the gradation value of said input image is higher than 0 and lower than said peak luminance value; and said processing circuitry generates said second conversion table by generating a cumulative density function from said histogram, and making said second output gradation value to be equal to the value of said cumulative density function or the value of a curve produced by setting a limit for a gradient of said cumulative density function.

2. The image processing device as set forth in claim 1, wherein, when said average luminance value is not lower than said threshold value, said processing circuitry generates, as said conversion table, a conversion table by which a width by which the gradation value of said output image is made lower than the gradation value of said input image in the range lower than said peak luminance value is made to be larger as said average luminance value is higher.

3. The image processing device as set forth in claim 1, wherein the superimposition is performed by processes including multiplication of said first output gradation value and said second output gradation value corresponding to the same gradation value of said input image.

4. The image processing device as set forth in claim 1, wherein said processing circuitry generates, said first conversion table by making a width by which said first output gradation value is made lower than the gradation value of said input image in a range lower than said peak luminance value is larger as said average luminance value is higher.

5. An image display apparatus comprising:
the image processing device as set forth in claim 1, and
said image display performing image display based on said output image.

6. An image processing device generating an output image based on an input image, and supplying the output image to a self-light emission image display, said image processing device having processing circuitry:
to calculate an average luminance value of said input image;
to generate a histogram representing a frequency of occurrence of gradation values of said input image for each class;
to calculate a peak luminance value of said input image;
to generate a conversion table defining a relation between a gradation value of said input image and a gradation value of said output image based on said average luminance value, said histogram and said peak luminance value; and
to generate said output image by converting said input image using said conversion table;
wherein
said processing circuitry generates said conversion table, using a trained neural network associating a combination of said average luminance value, said histogram, and said peak luminance value, with said conversion table, and
said trained neural network is one having been generated as a result of such training that, after the training, the conversion table satisfies predetermined conditions, the visibility of the displayed image obtained when said conversion table is used is good, and power consumption at said image display is small,
said predetermined conditions include:
that when said average luminance value is lower than said threshold value, the gradation value of said input image is made to be the gradation value of said output image without change,
that, in at least part of a range in which the gradation value of said input image is higher than 0 and lower than said peak luminance value, the gradation value of said output image is smaller than the gradation value of said input image, and
that in a gradation value range where the frequency of occurrence of the gradation values in said input image is high, variation in the gradation value of said output image against variation in the gradation value of said input image is relatively large, and, in a gradation value range where the frequency of occurrence of the gradation values in said input image is low, variation in the gradation value of said output image against variation in the gradation value of said input image is relatively small.

7. The image processing device as set forth in claim 6, wherein said predetermined conditions also include that a width by which the gradation value of said output image is lower than the gradation value of said input image in the range lower than the peak luminance value is larger as said average luminance value of said input image is higher.

8. An image display apparatus comprising:
the image processing device as set forth in claim 6, and
said image display performing image display based on said output image.

9. An image processing method in which an output image is generated based on an input image, and supplied to a self-light-emission image display, said method including:
calculating an average luminance value of said input image;
generating a histogram representing a frequency of occurrence of gradation values of said input image for each class;
calculating a peak luminance value of said input image;
generating a conversion table defining a relation between a gradation value of said input image and a gradation value of said output image based on said average luminance value, said histogram and said peak luminance value; and
generating said output image by converting said input image using said conversion table;
wherein,
said average luminance value is compared with a predetermined threshold value,
when said average luminance value is lower than said threshold value, a conversion table by which the gradation value of said input image is made to become the gradation value of said output image without change is generated as said conversion table,
when said average luminance value is not lower than said threshold value, a conversion table by which,
when the gradation value of said input image is equal to said peak luminance value, the gradation value of said output image is made to be also equal to said peak luminance value, and,
in at least part of a range in which the gradation value of said input image is higher than 0 and lower than said peak luminance value, the gradation value of said output image is made to be smaller than the gradation value of said input image, and
in a gradation value range where the frequency of occurrence of the gradation values in said input image is high, variation in the gradation value of said output image against variation in the gradation value of said input image is made to be relatively large, and, in a gradation value range where the frequency of occurrence of the gradation values in said input image is low, variation in the gradation value of said output image against variation in the gradation value of said input image is made to be relatively small
is generated as said conversion table;
said conversion table generated when said average luminance value is not lower than said threshold value is generated by superimposing a first conversion table with a second conversion table, said first conversion table defining a relation between the gradation value of said input image and a first output gradation value, and said second conversion table defining a relation between the gradation value of said input image and a second output gradation value;
said first conversion table is generated by making said first output gradation value to be a value smaller than the gradation value of said input image, in at least part of a range in which the gradation value of said input image is higher than 0 and lower than said peak luminance value; and said second conversion table is generated by generating a cumulative density function from said histogram, and making said second output gradation value to be equal to the value of said cumulative density function or the value of a curve produced by setting a limit for a gradient of said cumulative density function.

10. A non-transitory computer-readable recording medium in which the program causing a computer to execute processes in the image processing method as set forth in claim 9 is recorded.

11. An image processing device generating an output image based on an input image, said image processing device having processing circuitry:
  to calculate an average luminance value of said input image;
  to generate a histogram representing a frequency of occurrence of gradation values of said input image for each class;
  to calculate a peak luminance value of said input image;
  to generate a conversion table defining a relation between a gradation value of said input image and a gradation value of said output image based on said average luminance, said histogram and said peak luminance value; and
  to generate said output image by converting said input image using said conversion table;
  wherein
  said processing circuitry compares said average luminance value with a predetermined threshold value;
  when said average luminance value is lower than said threshold value, said processing circuitry generates, as said conversion table, a conversion table by which the gradation value of said input image is made to become the gradation value of said output image without change;
  when said average luminance value is not lower than said threshold value, said processing circuitry generates, as said conversion table, a conversion table by which, in at least part of a range in which the gradation value of said input image is higher than 0 and lower than said peak luminance value, the gradation value of said output image is made to be smaller than the gradation value of said input image, and in a range closer to said peak luminance value than said at least a part, a difference between the gradation value of said output image and the gradation value of said input image is made to be smaller than in said at least part of said range, or the gradation value of said output image is made to be larger than the gradation value of said input image, and
    in a gradation value range where the frequency of occurrence of the gradation values in said input image is high, variation in the gradation value of said output image against variation in the gradation value of said input image is made to be relatively large, and, in a gradation value range where the frequency of occurrence of the gradation values in said input image is low, variation in the gradation value of said output image against variation in the gradation value of said input image is made to be relatively small;
  said conversion table generated when said average luminance value is not lower than said threshold value is generated by superimposing a first conversion table with a second conversion table, said first conversion table defining a relation between the gradation value of said input image and a first output gradation value, and said second conversion table defining a relation between the gradation value of said input image and a second output gradation value;

said processing circuitry generates said first conversion table, by making said first output gradation value to be a value smaller than the gradation value of said input image, in at least part of a range in which the gradation value of said input image is higher than 0 and lower than said peak luminance value; and said processing circuitry generates said second conversion table by generating a cumulative density function from said histogram, and making said second output gradation value to be equal to the value of said cumulative density function or the value of a curve produced by setting a limit for a gradient of said cumulative density function.

12. The image processing device as set forth in claim 11, wherein, when said average luminance value is not lower than said threshold value, said processing circuitry generates, as said conversion table, a conversion table by which a width by which the gradation value of said output image is made lower than the gradation value of said input image in the range lower than said peak luminance value is made to be larger as said average luminance value is higher.

13. An image display apparatus having the image processing device as set forth in claim 11, and an image display performing image display based on said output image.

14. The image processing device as set forth in claim 11, wherein the superimposition is performed by processes including multiplication of said first output gradation value and said second output gradation value corresponding to the same gradation value of said input image.

15. The image processing device as set forth in claim 11, wherein said processing circuitry generates said first conversion table by making a width by which said first output gradation value is made lower than the gradation value of said input image in a range lower than said peak luminance value larger as said average luminance value is higher.

16. An image processing method in which an output image is generated based on an input image, said method including:
  calculating an average luminance value of said input image;
  generating a histogram representing a frequency of occurrence of gradation values of said input image for each class;
  calculating a peak luminance value of said input image;
  generating a conversion table defining a relation between a gradation value of said input image and a gradation value of said output image based on said average luminance value, said histogram and said peak luminance value; and
  generating said output image by converting said input image using said conversion table;
  wherein,
  said average luminance value is compared with a predetermined threshold value;
  when said average luminance value is lower than said threshold value, a conversion table by which the gradation value of said input image is made to become the gradation value of said output image without change is generated as said conversion table;
  when said average luminance value is not lower than said threshold value, a conversion table by which,
  in at least part of a range in which the gradation value of said input image is higher than 0 and lower than said peak luminance value, the gradation value of said output image is made to be smaller than the gradation value of said input image, and in a range closer to said peak luminance value than said at least a part, a difference between the gradation value of said output image and the gradation value of said input image is made to be smaller than in said at least part of said range, or the gradation value of said output image is made to be larger than the gradation value of said input image, and in a gradation value range where the frequency of occurrence of the gradation values in said input image is high, variation in the gradation value of said output image against variation in the gradation value of said input image is made to be relatively large, and, in a gradation value range where the frequency of occurrence of the gradation values in said input image is low, variation in the gradation value of said output image against variation in the gradation value of said input image is made to be relatively small is generated as said conversion table;

said conversion table generated when said average luminance value is not lower than said threshold value is generated by superimposing a first conversion table with a second conversion table, said first conversion table defining a relation between the gradation value of said input image and a first output gradation value, and said second conversion table defining a relation between the gradation value of said input image and a second output gradation value;

said first conversion table is generated by making said first output gradation value to be a value smaller than the gradation value of said input image, in at least part of a range in which the gradation value of said input image is higher than 0 and lower than said peak luminance value; and said second conversion table is generated by generating a cumulative density function from said histogram, and making said second output gradation value to be equal to the value of said cumulative density function or the value of a curve produced by setting a limit for a gradient of said cumulative density function.

17. A non-transitory computer-readable recording medium in which the program causing a computer to execute processes in the image processing method as set forth in claim 16 is recorded.

* * * * *